(12) United States Patent
Walcome

(10) Patent No.: US 11,242,673 B2
(45) Date of Patent: Feb. 8, 2022

(54) ANTI-FREEZING WATER VALVE WITH OPTIONAL ANTI-SIPHON ASSEMBLY AND WATER-VALVE ACCESSORIES

(71) Applicant: Aquor Water Systems, Incorporated, Port Townsend, WA (US)

(72) Inventor: Richard O. Walcome, Port Townsend, WA (US)

(73) Assignee: Aquor Water Systems, Incorporated, Port Townsend, WA (US)

( * ) Notice: Subject to any disclaimer, the term of this patent is extended or adjusted under 35 U.S.C. 154(b) by 0 days.

(21) Appl. No.: 15/873,867

(22) Filed: Jan. 17, 2018

(65) Prior Publication Data
US 2018/0202133 A1 Jul. 19, 2018

Related U.S. Application Data

(60) Provisional application No. 62/447,846, filed on Jan. 18, 2017, provisional application No. 62/478,381, (Continued)

(51) Int. Cl.
*E03B 9/02* (2006.01)
*E03B 9/14* (2006.01)
(Continued)

(52) U.S. Cl.
CPC ............... *E03B 9/027* (2013.01); *E03B 9/14* (2013.01); *E03C 1/108* (2013.01); *F16L 15/008* (2013.01);
(Continued)

(58) Field of Classification Search
CPC . E03B 7/077; E03B 7/10; E03B 9/025; E03B 9/027; E03B 9/14; E03B 2009/022;
(Continued)

(56) References Cited

U.S. PATENT DOCUMENTS 179,092 A * 6/1876 Booth .................... F16L 37/23
137/614.05
846,537 A 3/1907 Whiteford
(Continued)

FOREIGN PATENT DOCUMENTS

CN 104728455 A 6/2015
DE 102015006094 A1 9/2016

OTHER PUBLICATIONS

U.S. Patent and Trademark Office, "Restriction Requirement", U.S. Appl. No. 15/940,664, dated Jul. 1, 2019, pp. 1-9, Published: US.
(Continued)

*Primary Examiner* — Robert K Arundale
*Assistant Examiner* — Richard K. Durden
(74) *Attorney, Agent, or Firm* — Fogg & Powers LLC

(57) ABSTRACT

An embodiment of a fluid valve includes a substantially flat face plate, a receptacle, a cavity, and a valve assembly. The receptacle is disposed in the face plate and has at least one protrusion each configured to engage a respective at least one groove of a valve-opening-and-fluid-dispensing device. The cavity has a front end in fluid communication with the receptacle, and has a rear end. And the valve assembly is disposed in the cavity, includes a first sealing ring, is configured to form a seal by urging the sealing ring against the rear end of the cavity in response to the valve-opening-and-fluid-dispensing device being absent from the receptacle, and is configured to allow fluid to flow into the rear end of the cavity in response to the valve-opening-and-fluid-dispensing device being disposed in the receptacle.

12 Claims, 20 Drawing Sheets

Related U.S. Application Data filed on Mar. 29, 2017, provisional application No. 62/478,384, filed on Mar. 29, 2017.

(51) Int. Cl.
| | |
|---|---|
| *F16L 29/02* | (2006.01) |
| *E03C 1/10* | (2006.01) |
| *F16L 15/00* | (2006.01) |
| *F16K 15/02* | (2006.01) |

(52) U.S. Cl.
CPC ............ *F16L 29/02* (2013.01); *F16K 15/026* (2013.01); *Y10T 137/3294* (2015.04); *Y10T 137/6977* (2015.04)

(58) Field of Classification Search
CPC .. E03C 1/104; E03C 1/108; E03C 2001/0416; E03C 2001/0417; E03C 2201/50; F16K 1/12; F16K 1/46; F16K 15/188; F16K 24/02; F16L 37/244; F16L 37/48; F16L 47/285; Y10T 137/1189; Y10T 137/1298; Y10T 137/2557; Y10T 137/3294; Y10T 137/3331; Y10T 137/5392; Y10T 137/5397; Y10T 137/5403; Y10T 137/5491; Y10T 137/5497; Y10T 137/5509; Y10T 137/5521; Y10T 137/5538; Y10T 137/6137; Y10T 137/6977; Y10T 137/698

See application file for complete search history.

(56) References Cited

U.S. PATENT DOCUMENTS

| | | | | |
|---|---|---|---|---|
| 874,652 | A * | 12/1907 | Bailey | F16K 1/46 |
| | | | | 137/516.29 |
| 968,711 | A * | 8/1910 | Stevenson | A01K 7/06 |
| | | | | 251/339 |
| 1,067,583 | A * | 7/1913 | Brague | F16L 37/252 |
| | | | | 137/322 |
| 1,263,792 | A * | 4/1918 | Mueller | F16K 1/46 |
| | | | | 251/357 |
| 1,788,449 | A * | 1/1931 | Catlin | E03B 9/20 |
| | | | | 239/27 |
| 2,034,933 | A | 3/1936 | Wilson | |
| 2,292,674 | A | 8/1942 | Terrell et al. | |
| 2,630,131 | A * | 3/1953 | Rush | F16K 51/00 |
| | | | | 137/322 |
| 3,106,935 | A * | 10/1963 | Gatzke | E03B 7/12 |
| | | | | 137/218 |
| 3,199,831 | A | 8/1965 | Sully | |
| 3,494,373 | A * | 2/1970 | Horak | E03B 9/025 |
| | | | | 137/217 |
| 3,589,615 | A | 6/1971 | Cummins | |
| 4,112,966 | A * | 9/1978 | Carlson | E03B 9/14 |
| | | | | 137/282 |
| 4,178,956 | A * | 12/1979 | Fillman | E03B 9/02 |
| | | | | 137/302 |
| 4,298,166 | A | 11/1981 | White et al. | |
| 4,473,244 | A * | 9/1984 | Hill | E03B 7/12 |
| | | | | 137/360 |
| 4,475,570 | A | 10/1984 | Pike et al. | |
| 4,644,970 | A * | 2/1987 | Lowry | E03B 9/025 |
| | | | | 137/358 |
| 4,700,732 | A * | 10/1987 | Francisco | E03B 7/12 |
| | | | | 137/107 |
| 4,844,116 | A | 7/1989 | Buehler et al. | |
| 4,909,270 | A * | 3/1990 | Enterante, Sr. | E03B 7/10 |
| | | | | 137/107 |
| 4,971,097 | A * | 11/1990 | Hunley, Jr. | E03B 9/025 |
| | | | | 137/218 |
| 5,029,603 | A | 7/1991 | Ackroyd | |
| 5,158,105 | A | 10/1992 | Conway | |
| 5,372,158 | A * | 12/1994 | Berfield | E03C 1/104 |
| | | | | 137/217 |
| 5,533,546 | A | 7/1996 | Dixon | |
| 5,632,303 | A | 5/1997 | Almasy et al. | |
| 5,740,831 | A * | 4/1998 | DeNardo | E03B 7/10 |
| | | | | 137/218 |
| 5,765,816 | A * | 6/1998 | Chrysler | A62C 31/02 |
| | | | | 251/208 |
| 5,836,397 | A | 11/1998 | Craig et al. | |
| 6,024,175 | A | 2/2000 | Moore, Jr. et al. | |
| 6,250,688 | B1 | 6/2001 | Kirby | |
| 6,394,132 | B1 | 5/2002 | Walcome | |
| 6,450,264 | B1 | 9/2002 | Christian | |
| 6,536,534 | B1 | 3/2003 | Sundholm | |
| 6,644,340 | B2 * | 11/2003 | Rokkjaer | B67D 7/0294 |
| | | | | 137/212 |
| 6,752,167 | B1 * | 6/2004 | Stanaland | E03B 7/10 |
| | | | | 137/218 |
| 6,808,127 | B2 | 10/2004 | Mcnulty et al. | |
| 7,331,399 | B2 | 2/2008 | Multer | |
| 2002/0040732 | A1 * | 4/2002 | King, Jr. | F16L 41/065 |
| | | | | 137/318 |
| 2006/0042693 | A1 | 3/2006 | Holland et al. | |
| 2006/0201553 | A1 * | 9/2006 | Poskin | E03B 7/10 |
| | | | | 137/360 |
| 2006/0255658 | A1 | 11/2006 | Klee | |
| 2007/0056631 | A1 | 3/2007 | Seppmann | |
| 2007/0246567 | A1 | 10/2007 | Roberts | |
| 2008/0115835 | A1 | 5/2008 | Wu | |
| 2008/0245418 | A1 * | 10/2008 | Lawson | E03B 7/10 |
| | | | | 137/218 |
| 2010/0096028 | A1 * | 4/2010 | Qiu | F16K 15/026 |
| | | | | 137/538 |
| 2014/0144520 | A1 * | 5/2014 | Marchand | E03B 9/027 |
| | | | | 137/60 |
| 2014/0262359 | A1 | 9/2014 | Poncia et al. | |
| 2016/0225895 | A1 | 8/2016 | He et al. | |
| 2016/0327164 | A1 * | 11/2016 | Tyers | F16K 1/36 |
| 2017/0326391 | A1 | 11/2017 | Briscoe et al. | |
| 2018/0179741 | A1 * | 6/2018 | Kim | E03B 7/10 |

OTHER PUBLICATIONS

International Searching Authority; Notification of Transmittal of the International Search Report and the Written Opinion of the International Searching Authority, or the Declaration from PCT Application No. PCT/US2018/014112 dated May 7, 2018; from Foreign Counterpart of U.S. Appl. No. 15/873,867; dated May 7, 2018; pp. 1-20; Published: PCT.

International Searching Authority; "Notification of Transmittal of the International Search Report and the Written Opinion of the International Searching Authority" from PCT Application No. PCT/US2018/025271 dated Jun. 22, 2018; from Foreign Counterpart of U.S. Appl. No. 15/940,664; pp. 1-15; filed Jun. 22, 2018; Published: US.

Walcome, "Anti-Freezing Water Valve Configured for Underground (Buried) Use and With Optional Anti-Siphon Assembly, and Water-Valve Accessories", U.S. Appl. No. 15/940,647, filed Mar. 29, 2018, pp. 1-65, Published in:US.

Walcome, "Fire-Suppression Water-Intake Valve, Fire-Suppression Sprinkler Head Configured for Rapid Installation in, and Rapid Removal From, the Water-Intake Valve Without the Need to Interrupt the Water Supply, and Related Systems and Methods", "U.S. Appl. No. 15/940,664, filed Mar. 29, 2018", pp. 1-47, Published in: US.

International Searching Authority; "Notification of the International Search Report and the Written Opinion of the International Searching Authority, or the Declaration from PCT Application No. PCT/US2018/025269 dated Aug. 8, 2018"; from Foreign Counterpart of U.S. Appl. No. 15/940,647; pp. 1-15; dated Aug. 8, 2018; Published: US.

International Bureau, "International Preliminary Report on Patentability from PCT Application No. PCT/US2018/014112 dated Aug. 1, 2019", from Foreign Counterpart to U.S. Appl. No. 15/873,867, pp. 1-12, Published: WO.

(56) References Cited

OTHER PUBLICATIONS

International Bureau, "International Preliminary Report on Patentability from PCT Application No. PCT/US2018/025269 dated Oct. 10, 2019", from Foreign Counterpart to U.S. Appl. No. 15/940,647, pp. 1-8, Published: WO.
International Bureau, "International Preliminary Report on Patentability from PCT Application No. PCT/US2018/025271 dated Oct. 10, 2019", from Foreign Counterpart to U.S. Appl. No. 15/940,664, pp. 1-9, Published: WO.
U.S. Patent and Trademark Office, "Office Action", U.S. Appl. No. 15/940,664, dated Dec. 2, 2019, pp. 1-36, Published: US.
U.S. Patent and Trademark Office, "Restriction Requirement", U.S. Appl. No. 15/940,647, dated Jan. 8, 2020, pp. 1-5, Published: US.
U.S. Patent and Trademark Office, "Final Office Action", U.S. Appl. No. 15/940,664, dated Jul. 22, 2020, pp. 1 through 26, Published: US.
U.S. Patent and Trademark Office, "Office Action", U.S. Appl. No. 15/940,647, dated Jun. 1, 2020, pp. 1 through 51, Published: US.
U.S. Patent and Trademark Office, "Advisory Action", U.S. Appl. No. 15/940,664, dated Nov. 3, 2020, pp. 1 through 4, Published: US.
U.S. Patent and Trademark Office, "Office Action", U.S. Appl. No. 15/940,647, dated Dec. 10, 2020, pp. 1 through 23, Published: US.
U.S. Patent and Trademark Office, "Office Action", U.S. Appl. No. 15/940,664, dated Mar. 4, 2021, p. 1 through 29, Published: US.
U.S. Patent and Trademark Office, "Notice of Allowance", U.S. Appl. No. 15/940,647, dated Jul. 28, 2021, pp. 1-20, Published: US.
European Patent Office, "Extended European Search Report from EP Application No. 18742210.0", from Foreign Counterpart to U.S. Appl. No. 15/873,867, dated Sep. 2, 2021, pp. 1-8, Published: EP.

* cited by examiner

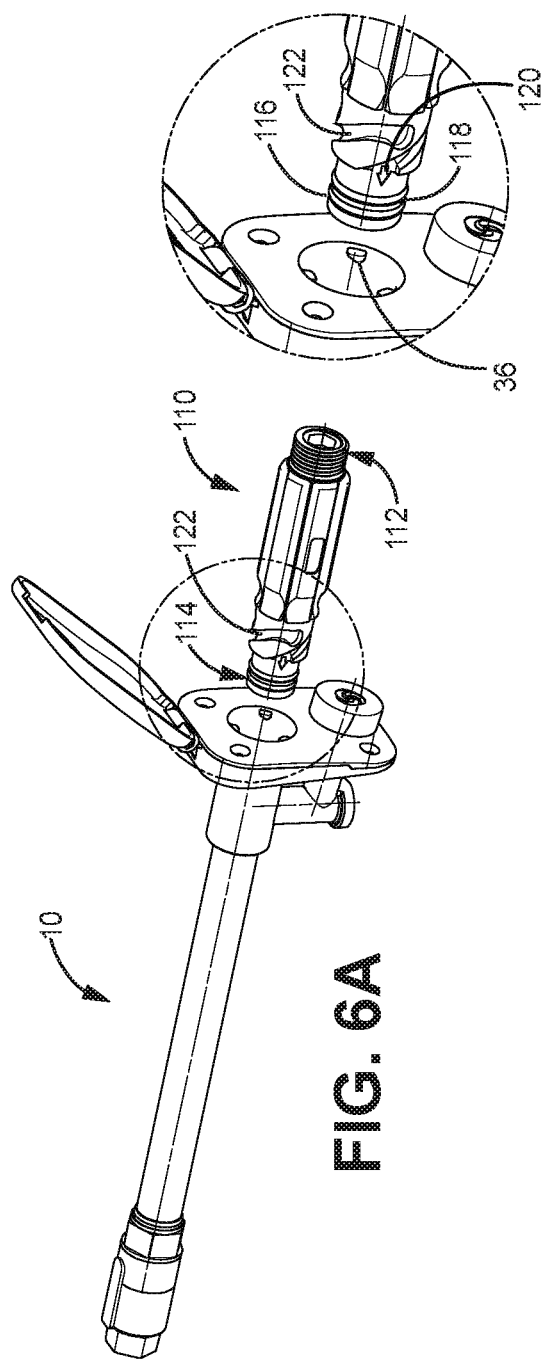
FIG. 6A
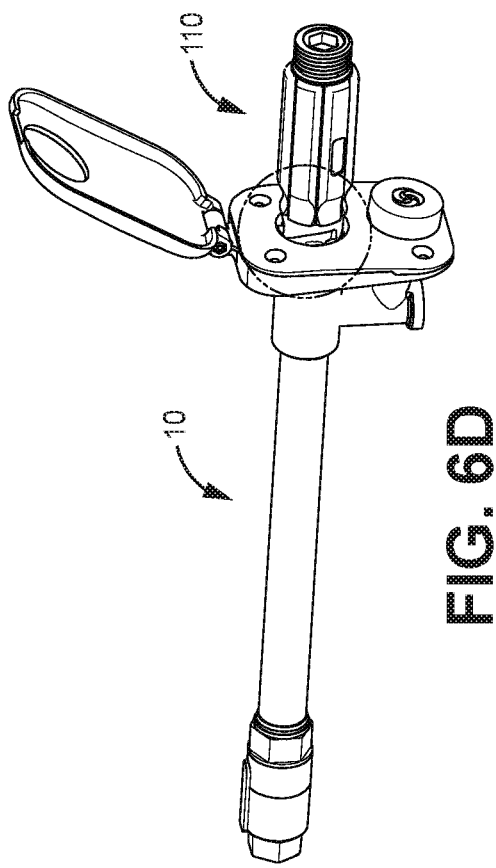
FIG. 6B
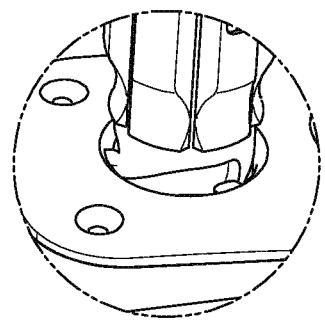
FIG. 6C
FIG. 6D

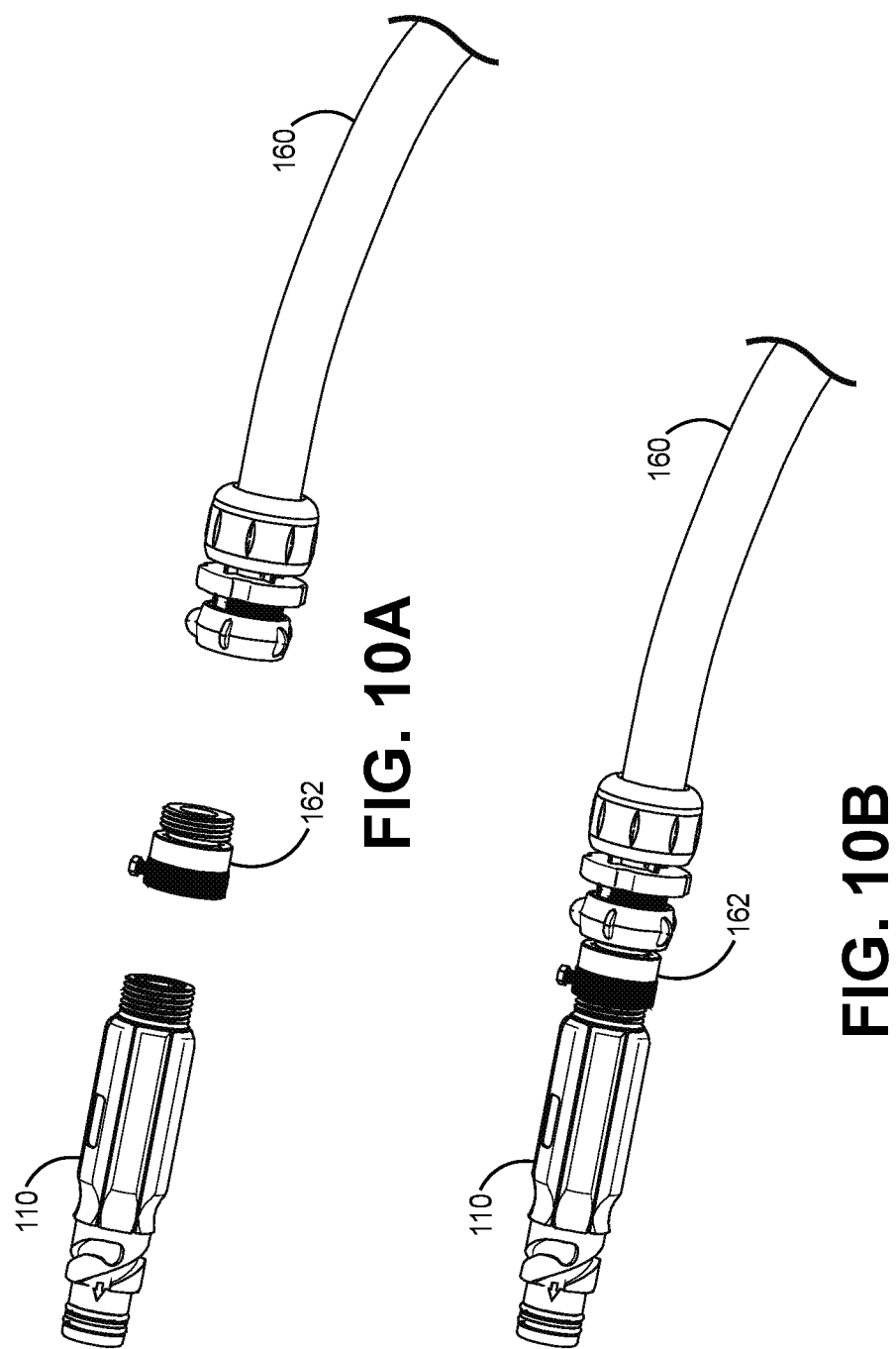

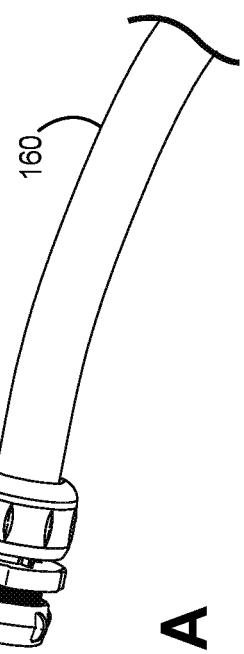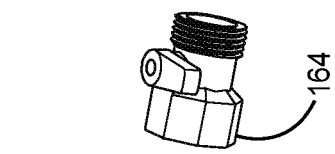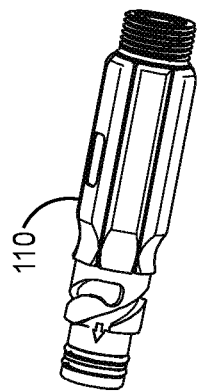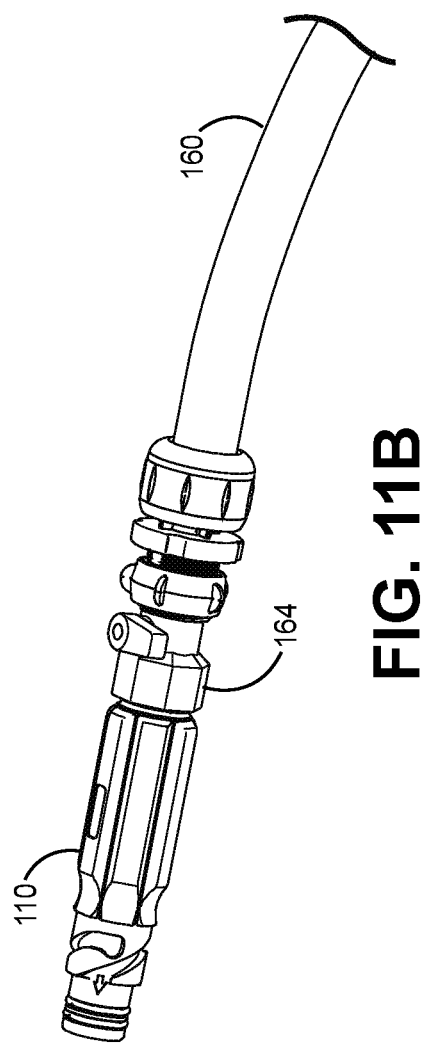
FIG. 11A
FIG. 11B

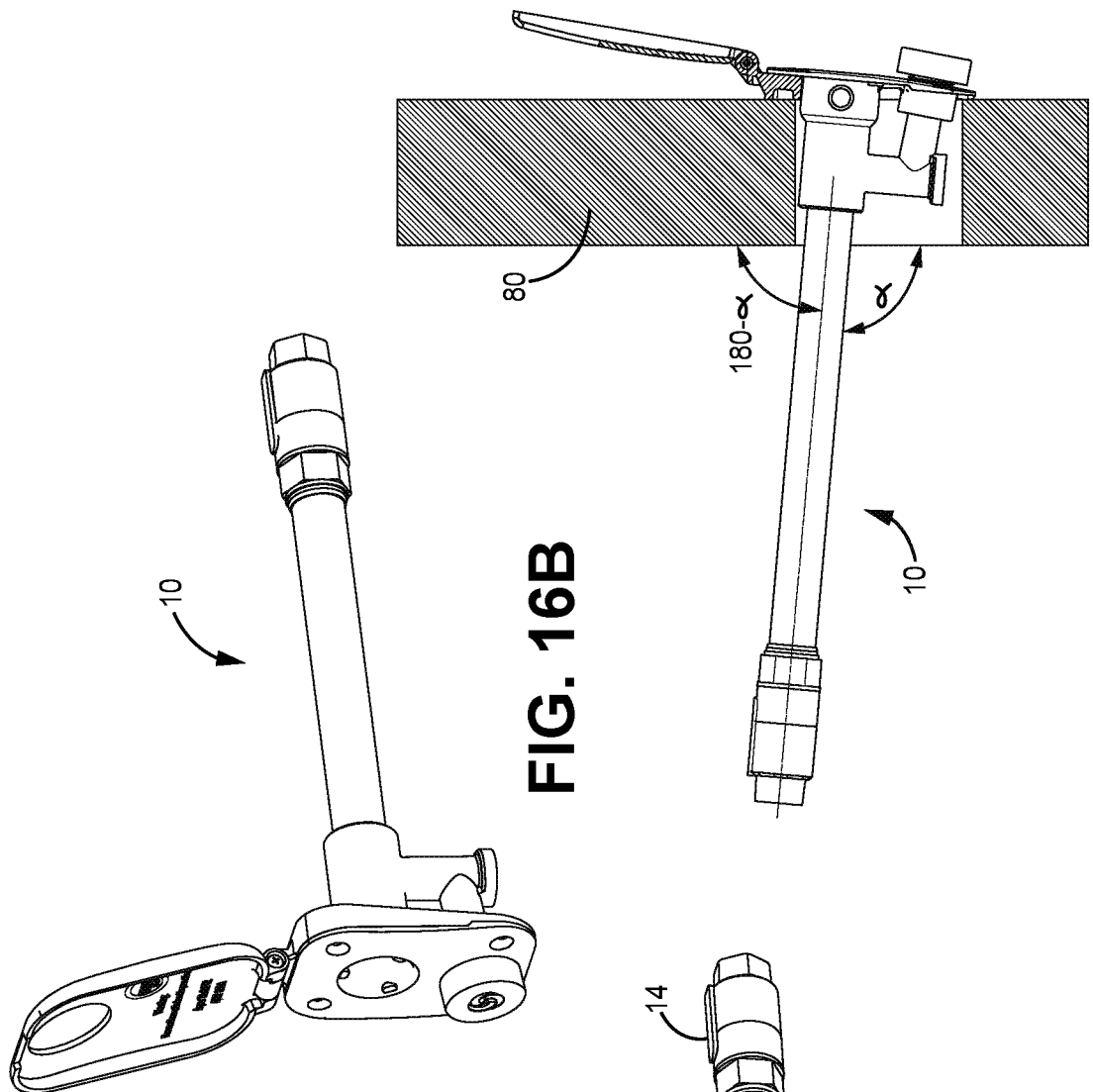
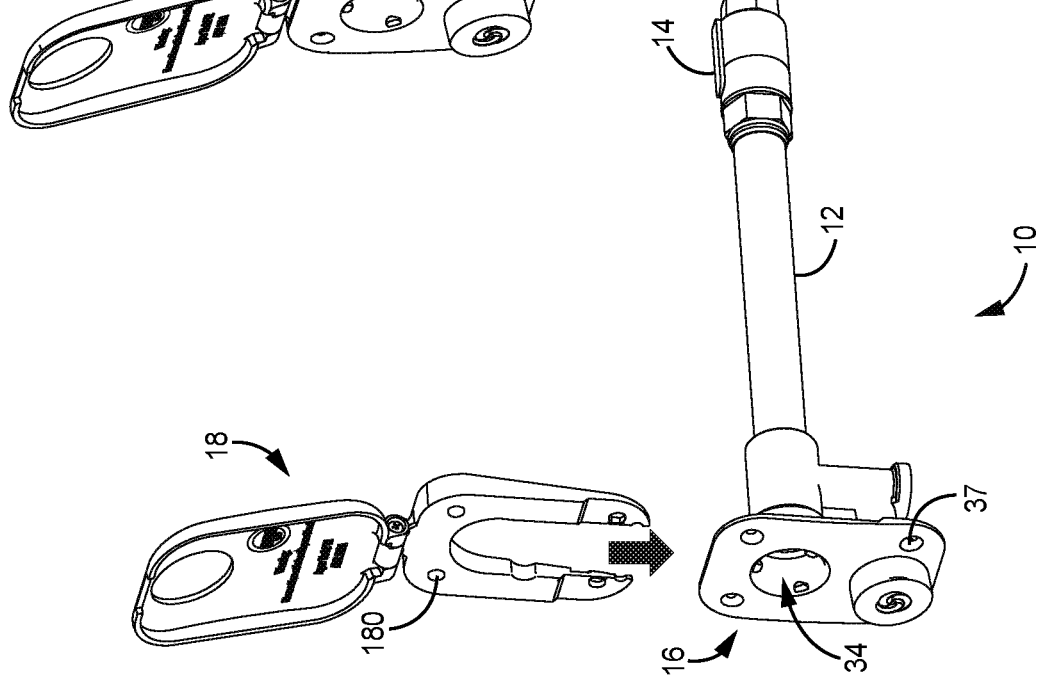
FIG. 16A
FIG. 16B
FIG. 16C

ANTI-FREEZING WATER VALVE WITH OPTIONAL ANTI-SIPHON ASSEMBLY AND WATER-VALVE ACCESSORIES

CROSS-RELATED APPLICATIONS

This application claims benefit of priority to the following U.S. Patent Applications, which are incorporated by reference: U.S. Provisional Patent Application Ser. No. 62/447,846, entitled "ANTI-FREEZING WATER VALVE WITH OPTIONAL ANTI-SIPHON ASSEMBLY," filed 18 Jan. 2017; U.S. Provisional Patent Application Ser. No. 62/478,381, entitled "ANTI-FREEZING WATER VALVE CONFIGURED FOR UNDERGROUND (BURIED) USE AND WITH OPTIONAL ANTI-SIPHON ASSEMBLY," filed 29 Mar. 2017; and U.S. Provisional Patent Application Ser. No. 62/478,384, entitled "FIRE SUPPRESSION SPRINKLER ASSEMBLY INCLUDING A SPRINKLER HEAD CONFIGURED FOR RAPID INSTALLATION AND REPLACEMENT WITHOUT THE NEED TO INTERRUPT THE WATER SUPPLY," filed 29 Mar. 2017.

SUMMARY

An embodiment of an anti-freezing water valve for the exterior of a structure (e.g., a home, commercial building, boat or other vessel) includes a water cavity, a coupling, a face-plate assembly, a cover assembly, a receptacle, and a valve assembly. The coupling is removably and rotatably attachable to a rear end of the water cavity, the face-plate assembly is attachable to a front end of the water cavity, and the cover assembly is attachable to the face-plate assembly. The receptacle is disposed in the face-plate assembly and is configured to receive a water handle or other valve-opening device. And the valve assembly is disposed inside of the water cavity and is configured to enable water flow when the water handle is installed in the receptacle, and to disable water flow when the water handle is removed from the receptacle.

Such a water valve has one or more advantages as compared to a conventional water faucet. Because the water valve has no integral faucet or spigot, the face-plate assembly can be mounted flush against the side of a structure through which the water valve extends. Such flush mounting can be aesthetically pleasing, and can reduce or eliminate injuries and other damages due to a person or object bumping into a conventional faucet or spigot. Furthermore, the absence of a faucet and spigot can deter or prevent unauthorized water usage. Moreover, the coupling to the structure's water system can be configured to allow rotation of the water valve for easy orientation of the face-plate assembly without the need to disconnect and reinstall the water valve. In addition, the cover assembly can include an integral wedge that is configured to force an installer to install the water valve at an appropriate angle such that water drains from water cavity when the water handle is disconnected from the receptacle.

In another embodiment, the water valve further includes an anti-siphon assembly that is configured to reduce or eliminate water leakage while water within the water cavity exhibits a positive water pressure or a negative water pressure relative to water pressure in a hose or other conduit connected to the water valve, and that is configured to allow an anti-siphon tube to drain when the water handle is disconnected from the receptacle.

Another embodiment relates to an anti-siphon anti-freezing rapid water-intake valve which has simple structure and is composed of a water-intake handle with a water outlet and a water-intake valve body with a water inlet, wherein the water-intake valve body is internally provided with a water valve, the water-intake handle is simply spliced with the water-intake valve body to realize smooth water flow; the valve body is inclined on wall by a certain angle, so when the water-intake handle is pulled out, the residual water in the water-intake valve body will automatically drain out; an internal valve of the water-intake valve body is used for isolating the tap water at an anti-freezing position, and the distance can be determined according to specific anti-freezing requirements in order to ensure that the pipe is not frozen or cracked in cold winter, thus facilitating users and saving water resources; the water-intake valve body is also provided with a one-way valve, and the one-way valve is closed during water supply, but once the water supply pipe is decompressed, the one-way valve will be automatically opened to introduce air into the valve body cavity to avoid a siphonic effect and accordingly prevent waste water from being reversely sucked into the water supply pipe.

BRIEF DESCRIPTION OF THE DRAWINGS

FIGS. 6A-6D are a set of exploded isometric views of the water valve of FIGS. 1-2 and 4-5, and the water handle of FIG. 5, the views illustrating a procedure for attaching the water handle to the water valve, according to an embodiment.

FIGS. 10A-10B are a set of views including an exploded isometric view (FIG. 10A) and an unexploded isometric view (FIG. 10B) of the water handle of FIGS. 5-7 attached to a hose via an optional vacuum breaker, according to an embodiment.

FIGS. 11A-11B are a set of views including an exploded isometric view (FIG. 11A) and an unexploded isometric view (FIG. 11B) of the water handle of FIGS. 5-7 attached to a hose via an optional valve switch, according to an embodiment.

FIG. 16A-16C are a set of views of the water valve and cover assembly of FIGS. 1-2, 4-7, 12A-13B, and 15A-15E (FIG. 16A shows the cover assembly exploded from the face-plate assembly), and of the installed water valve of FIG. 2, according to an embodiment.

DETAILED DESCRIPTION

In the following description, "approximate," "approximately," "about," and "substantially," mean that a quantity (e.g., a length) can vary from a given value (e.g., 10 feet) by up to ±20% (e.g., ±20% of 10 feet=±2 feet, which means an "approximate" value of 10 feet can range from 10−2=8 feet to 10+2=12 feet.

Figure 1:
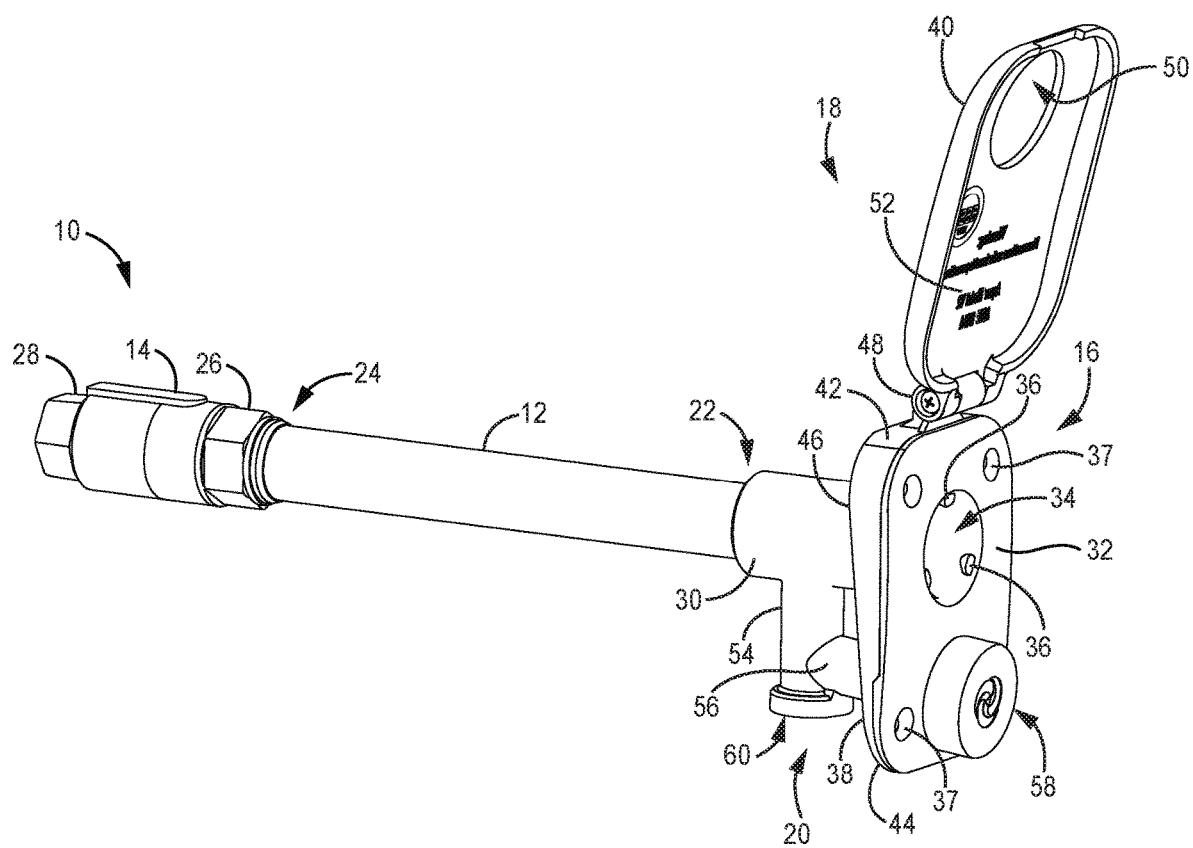
FIG. 1 is an isometric view of an anti-freeze, anti-siphon water valve, according to an embodiment.

FIG. 1 is an isometric view of an anti-freeze, anti-siphon water valve 10, according to an embodiment. In a typical application, the water valve 10 is installed through an exterior side wall of a structure (not shown in FIG. 1), such as a home, warehouse or other building, or a ship or other vessel, to provide a source of water for, e.g., watering a lawn or garden, filling a swimming pool or spa, washing a vehicle or other object, or filling a bucket or other tank. As described below, the water valve 10 is configured for time-saving installation and removal, freeze prevention, and siphon prevention, and for providing a substantially flat profile and a substantially flat interface for water-sourcing equipment such as a garden hose.

The water valve 10 includes a water cavity 12, a threaded connector (herein after "coupler") 14, a face-plate assembly 16, a cover assembly 18, and an anti-siphon assembly 20. The water valve 10 also includes a valve assembly (not shown in FIG. 1) that is described below in conjunction with FIGS. 4-5.

The water cavity 12 is a hollow tube having a front end 22 and a rear end 24. The front end 22 is a male end that is configured for attachment to the face-plate assembly 16 by, e.g., welding, and the rear end 24 is a threaded male end that is configured for engaging the threaded coupler 14. The water cavity 12 can be made from any suitable material such as a metal (e.g., stainless steel) or a polymer (e.g., polyvinyl chloride (PVC)). As described below, the water cavity 12 is configured to provide a thermal barrier between the outside of the structure in which the water valve 10 is installed and the structure's water-supply-and-distribution system (not shown in FIG. 1) to prevent freezing of water within the structure's water-supply-and-distribution system and within the water valve itself. Depending on the temperatures to which the water valve 10 is expected to exposed, the length of the water cavity 12 can be adjusted to virtually any length suitable to provide a desired level of freeze protection. For example, the water cavity 12 can have lengths of approximately four inches, six inches, eight inches, and twelve inches.

The threaded coupler 14 is configured to allow leak-proof coupling of the water valve 10 to a water pipe, or other water conduit, of a structure's water-supply-and-distribution system (not shown in FIG. 1). The coupler 14 includes a front end 26 and a rear end 28. The front end 26 is a threaded female end configured for engaging the threaded male rear end 24 of the water cavity 12, and the rear end 28 is a threaded female end configured to engage a male end of a pipe, other conduit, or connector of the structure's water-supply-and-distribution system. As described below in conjunction with FIGS. 2 and 3, the coupler 14 is configured to allow a plumber or other installer to rotate the face-plate assembly 16 relative to the front end 26 of the coupler so as to easily and quickly place the face-plate assembly into a desired orientation relative to the structure's side wall. Furthermore, like the water cavity 12, the coupler 14 can be made from any suitable material such as a metal (e.g., stainless steel) or a polymer (e.g., polyvinyl chloride (PVC)), but is typically made from the same material as the water cavity.

The face-plate assembly 16 includes a rear end 30, a face plate 32, a receptacle 34 disposed in the face plate 32 and in fluid communication with the rear end 30, engagement protrusions (sometimes called "salient points") 36 approximately evenly distributed around the an inner wall of the receptacle, and mounting holes 37. The rear end 30 is a female connector that is configured for attachment to the front end 22 of the water cavity 12 by threading, adhesive, or welding. The face plate 32 is configured to protrude from an opening in the wall of a structure when the water valve 10 is installed in the structure, and is configured to cover the opening in an aesthetically pleasing manner. The receptacle 34 is configured to receive an attachment, such as a water handle or other water connector (not shown in FIG. 1), that, when installed in the receptacle, opens the water valve 10 such that water flows from the structure's water-supply-and-distribution system, through the coupler 14, the water cavity 12, the face plate's rear end 30, and out from the receptacle. And the engagement protrusions 36 are configured to engage the attachment and to allow one to install the attachment in the receptacle 34 and remove the attachment from the receptacle. Like the water cavity 12, the face plate 32 can be made from any suitable material such as a metal (e.g., stainless steel) or a polymer (e.g., PVC), but is typically made from the same material as the water cavity.

The cover assembly 18 includes a wedge 38, a cover 40, and mounting holes configured for alignment with the mounting holes 37 of the face-plate assembly 16. The wedge 38 is configured to fit behind the face plate 32, and is tapered from one end (e.g., the top end) 42 to another end (e.g., the bottom end) 44 to increase the chances that the water cavity 12 is angled sufficiently for water to drain from the water cavity out through the receptacle 34 when the water valve 10 is closed. For example, assuming that the portion of the structure's wall abutting a back 46 of the wedge 38 is "plumb," i.e., perpendicular to a level reference surface, the taper angle of the wedge causes the water cavity 10 to be angled downward toward the receptacle 34, relative to the level reference surface, by, e.g., approximately 1°-45°, for example, by approximately 5°. Furthermore, at any point along its height, the wedge 38 may have a thickness in an approximate range of $\frac{1}{16}$ to $\frac{1}{2}$ inch. And the cover 40 is attached to the end 42 of the wedge 38 with a hinge 48, and is configured to cover the face plate 32 and the receptacle 34 while the water valve 10 is closed and not in use. Furthermore, the cover 40 can include an opening 50 configured to fit over an exposed portion of the anti-siphon assembly 20 while the cover is in a closed position. Moreover, information, such as the serial number, model number, and information regarding approval of the water valve 10 by an industry-standards body, can be printed on, engraved in, or otherwise attached to, an inner surface 52 of the cover 40. In addition, there may be insulation (not shown in FIG. 1) disposed between the face plate 32 and the wedge 38, or behind the wedge 38, to thermally seal the opening in the structure's wall through which the water valve 10 extends. And like the water cavity 12, the cover assembly 18 can be made from any suitable material such as a metal (e.g., stainless steel) or a polymer (e.g., PVC), and can be made from one material (e.g., PVC) even when the face-plate assembly 16 is made from another material (e.g., stainless steel).

The anti-siphon assembly 20 includes respective vertical and horizontal hollow tubes 54 and 56, which are formed integrally with the face-plate assembly 16, an anti-siphon valve assembly 58, and an optional threaded drain plug 60. As described below in conjunction with FIGS. 8-9, the anti-siphon assembly 20 is configured to prevent water, or another substance, from entering a structure's water-supply-and-distribution system via the water valve 10, and is also configured to allow water to drain from the tubes 54 and 56 while the water valve is closed. And because the anti-siphon assembly 20 is disposed at the bottom, not the top, of the face-plate assembly 16, water discharged from the anti-siphon valve assembly 58 does not drip over the upper portions of the face-plate assembly, over a water handle, or over another device (not shown in FIG. 1) engaged with the receptacle 34.

Still referring to FIG. 1, alternate embodiments of the water valve 10 are contemplated. For example, the ends 22, 24, 26, 28, and 30 can be of types other than respectively described. Examples of such other types of ends include male and female threaded ends, male and female ends configured for welding or adhering with an adhesive, and male and female ends configured for crimp connecting. Furthermore, the anti-siphon assembly 20 can be omitted from the water valve 10. Moreover, the hinge 48 can be disposed at the bottom end 44 of the wedge 38 such that the cover 40 opens and closes from the end 44 of the wedge instead of from the top end 42; or the hinge can be disposed along one of the sides of the wedge.

Figure 2:
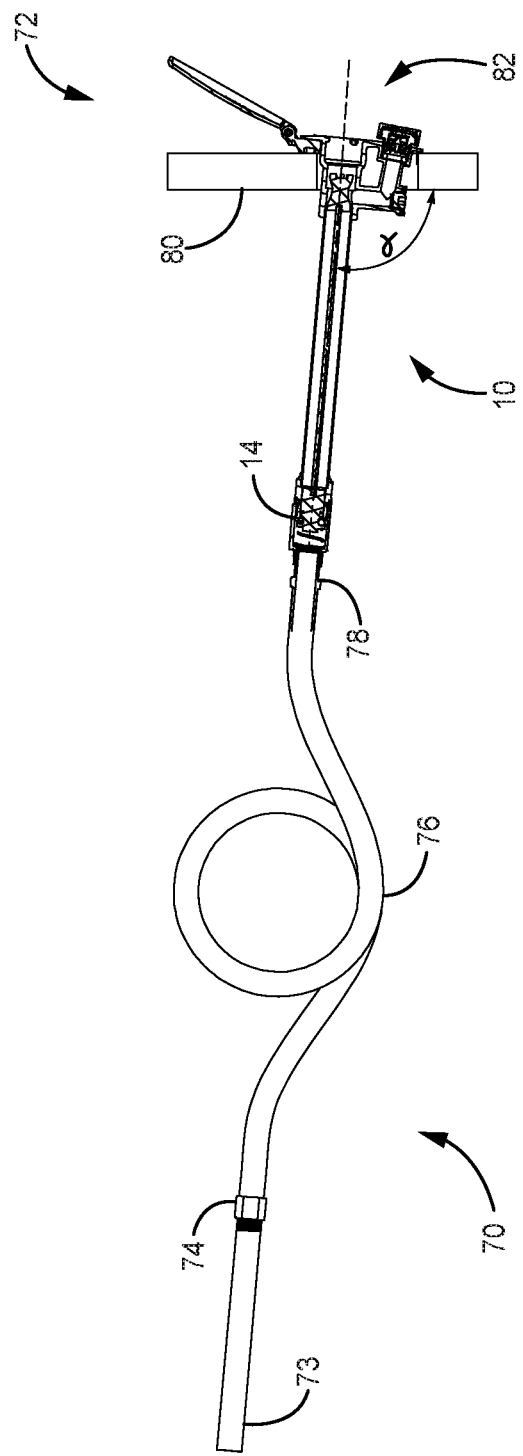
FIG. 2 is a side view of the water valve of FIG. 1 installed through the side of a structure, such as a residential home, according to an embodiment.

FIG. 2 is a side view, with portions broken away, of an installation 70 of the water valve 10 of FIG. 1 in a structure 72, according to an embodiment. The installation 70 includes a water pipe 73 of the structure's water-supply-and-distribution system, a connector 74, a flexible transition conduit 76, a male connector 78, and the water valve 10. And the structure 72 includes an exterior wall 80 through which the water valve 10 is mounted.

Figure 3A:
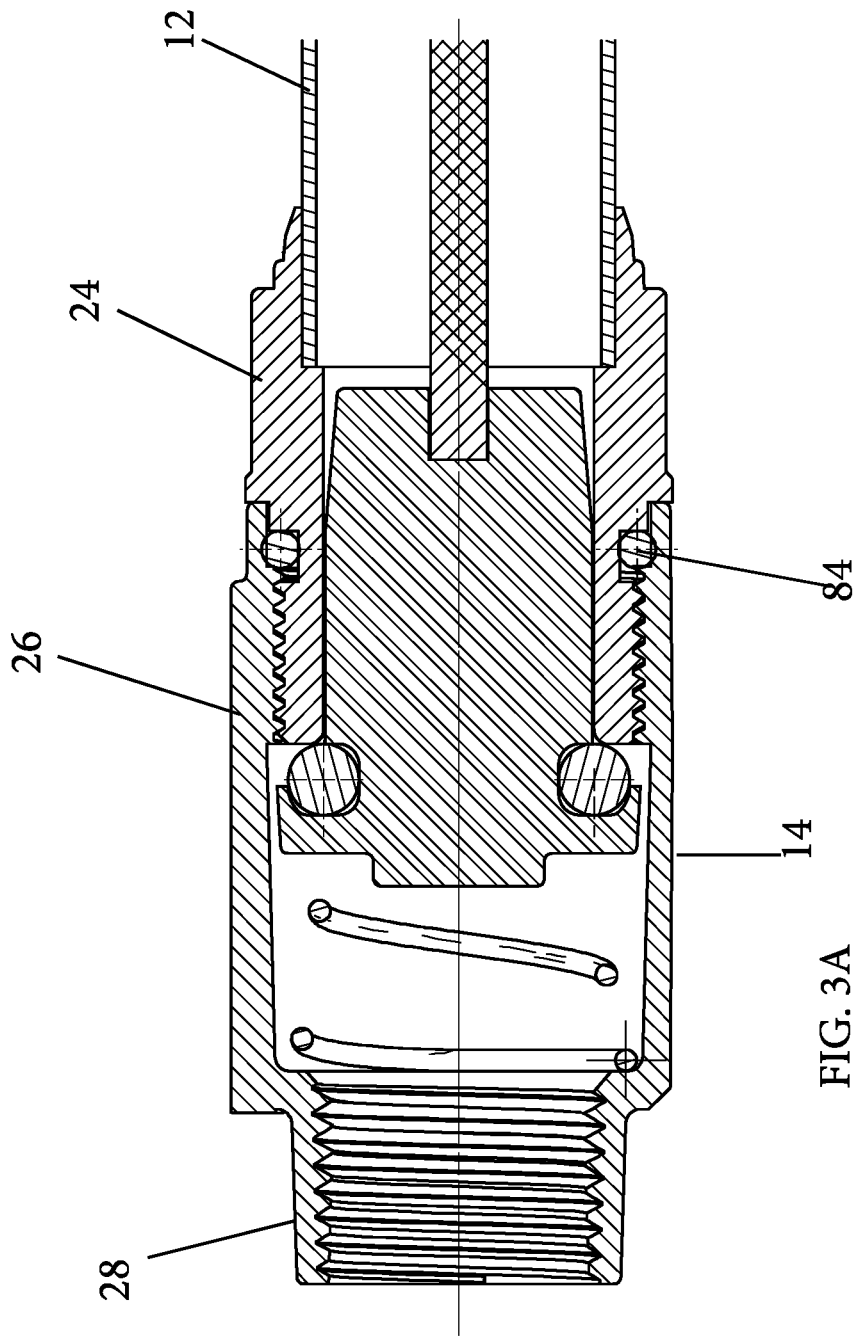
FIGS. 3A-3C are, respectively, a set of cutaway side views of the water-valve coupler and the valve assembly of FIGS. 1-2, and an isometric view of the water-valve coupler, according to an embodiment.
Figure 3B:
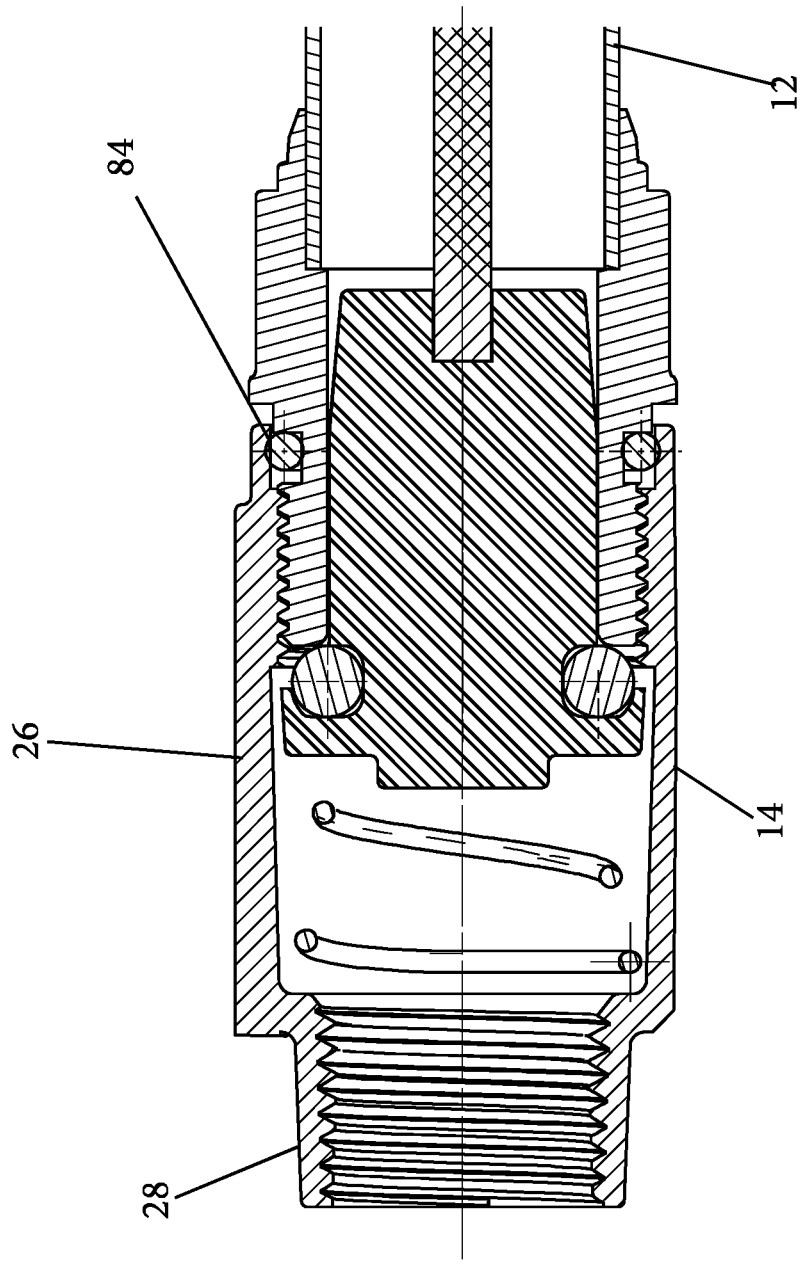
Figure 3C:
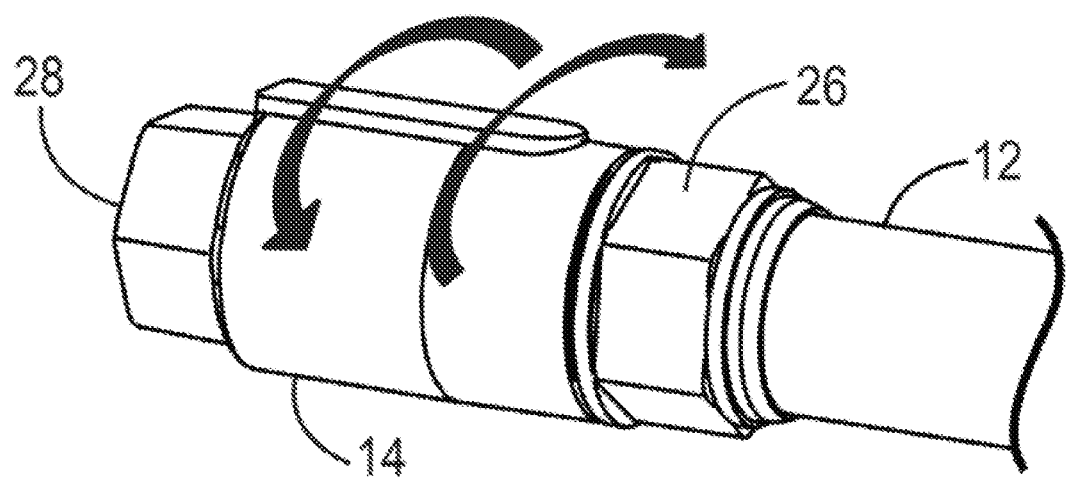

FIGS. 3A-3C are, respectively, cutaway side views of the coupler 14 and the rear end 24 of the water cavity 12 of FIGS. 1 and 2, and an isometric view of the coupler and the rear end of the water cavity 12, according to an embodiment.

Referring to FIGS. 1-3C, a procedure for installing the water valve 10 in the structure 72 is described, according to an embodiment.

First, an installer, such as a plumber (installer not shown in FIGS. 1-3C), drills, or otherwise forms, a hole 82 in the exterior wall 80 of the structure 72 in a conventional manner. The hole 82 is large enough to receive the rear end 30 of the face-plate assembly 16 (including the anti-siphon assembly 20 if present), but is small enough so that the face plate 32 can cover the hole after the installation is complete.

Next, the installer turns off the water supply to the water pipe 73, and connects the connector 74 to the water pipe in a conventional manner.

Then, the installer cuts the transition conduit 76 to a length sufficient for the connector 78 to extend a distance outside of the hole 82 so as to allow the installer to connect the water valve 10 to the transition conduit outside of the structure 72. This also facilitates future replacement of the water valve 10 without the need for an installer to break through an interior wall of the structure 72 to gain access to the connector 78; that is, the installer can pull the water valve and connector 78 through the hole 82, and disconnect the water valve from the outside of the structure.

Next, the installer connects a rear end of the transition conduit 76 to the connector 74 in a conventional manner, and installs the connector 78 onto a front end of the transition conduit in a conventional manner.

Then, the installer pulls the front end of the transition conduit 76 out of the structure 72 through the hole 82, and screws the rear end 28 of the coupler 14 onto the connector 78. Before screwing the rear end 28 of the coupler 14 onto the connector 78, the installer may apply a sealant, such as Teflon® tape or plumber's paste, onto the threads of one or both of the rear end 28 and the connector 78.

Next, the installer pushes the coupler 14, water cavity 12, and rear end 30 of the face-plate assembly 16 (and the tubes 54 and 56 of the anti-siphon assembly 20 if present) into the hole 82, and determines if he/she can position the face plate 32 straight in a vertical dimension (or in any other desired orientation) without unduly twisting the transition conduit 76 or the water pipe 73.

If the installer cannot position the face plate 32 straight in a vertical dimension (or in any other desired orientation) without unduly twisting the transition conduit 76 or the water pipe 73, and the coupling between the front end 26 of the coupler 14 and the rear end 24 of the water cavity 12 were conventional, then the installer would need to unscrew the rear end 28 of the connector 14 from the connector 78, and apply Teflon® tape (or more or less tape if some is already applied) or another material to the threads of the rear end 28 of the connector 78 so as to change the "all-the-way" rotational position (the position in which the rear end 28 stops rotating relative to the connector 78) to a position that provides the desired orientation of the face plate 32. This conventional procedure often requires multiple, trial-and-error attempts that gradually approach the desired orientation; therefore, this conventional procedure can take a significant amount of the installer's time (e.g., approximately fifteen minutes to one hour) during which he/she could be performing other tasks.

But referring to FIG. 3, due to the unique design of the rear end 24 of the water cavity 12, if the installer cannot position the face plate 32 straight in a vertical dimension (or in any other desired orientation) without unduly twisting the transition conduit 76 or the water pipe 73, then he/she simply rotates the water cavity 12 relative to the front end 26 of the coupler 14 until the face plate 32 has the desired orientation. The water cavity 12 includes an O-ring 84 around the outside of the water-cavity rear end 24. Therefore, even if the water-cavity rear end 24 is not screwed "all the way" into the front end 26 of the coupler 14, the O-ring 84 prevents water from leaking at the junction of the water cavity 12 and the coupler. For example, the O-ring 84 is positioned so as to allow an installer to rotate the water cavity 10, and thus the face plate 32, up to 360° back from the all-the-way position. Consequently, the installer can position the face plate 32 in any desired orientation by screwing the rear end 24 of the water cavity 12 all the way into the front end 26 of the coupler 14, and then "backing out" (i.e., unscrewing) the water cavity until the face plate 32 has the desired orientation relative to the wall 80 of the structure 72.

After the installer orients the face plate 32 as desired, he/she positions the wedge 38 of the cover assembly 18 behind the face plate so that the mounting holes of the wedge are aligned with the mounting holes 37 of the face plate.

Next, the installer inserts screws or nails through the mounting holes 37 to secure the face plate 32, the wedge 38, and thus the water valve 10, to the wall 80. As described above, the taper of the wedge 38 forms, between the water cavity 12 and the wall 80, an angle α>90° so that water remaining in the water cavity after the water valve 10 is closed will drain naturally, due to gravity, out of the receptacle 34 (and out of the anti-siphon assembly 20 if present); if the water did not drain from the water cavity, then it could freeze and reduce the level of thermal isolation that the water cavity provides between the environment outside of the structure 72 and the transition conduit 76. For example, ~95°≤α≤~100°.

Then, the installer can reestablish water pressure to the water pipe 73 and check the installation 70 for leaks and for proper operation of the water valve 10.

Still referring to FIGS. 1-3C, alternate embodiments of the above-described installation procedure are contemplated. For example, one or more of the above steps can be performed in an order different than described, one or more of the above steps can be omitted, and one or more other steps can be added.

Figure 4:
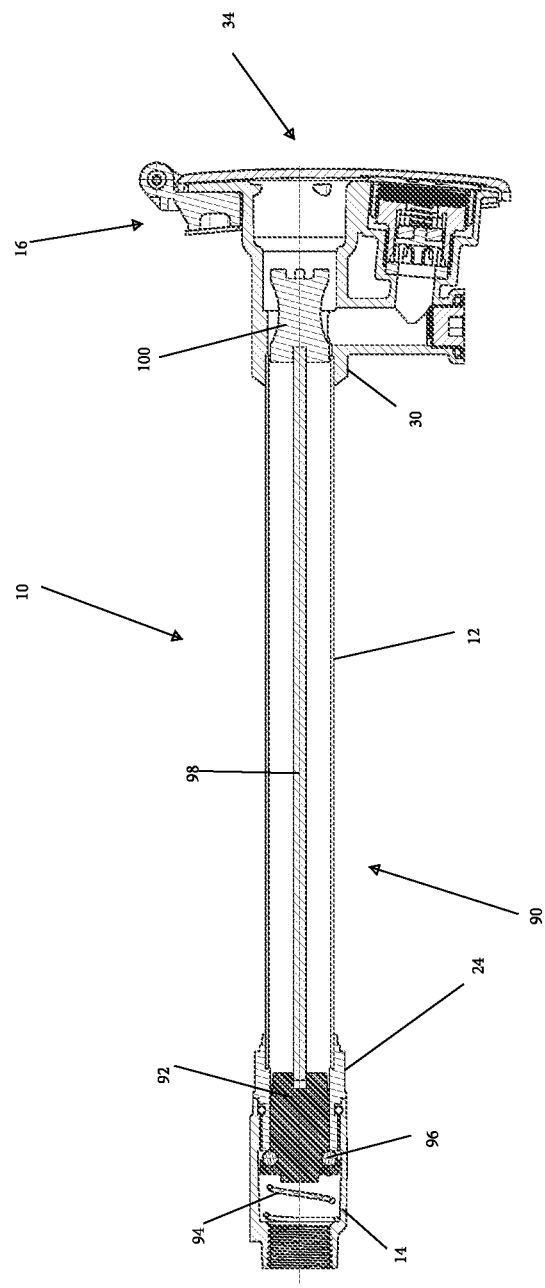
FIG. 4 is a cutaway side view the water valve of FIGS. 1-2 while the water valve is closed, according to an embodiment.

FIG. 4 is a cutaway side view of the water valve 10 of FIGS. 1-3C in a closed position, according to an embodiment.

In addition to the structures and components described above, the water valve 10 includes a valve assembly 90, which includes a valve piston 92, a piston-return spring 94, a piston-sealing ring 96, a connecting rod 98, and a member 100.

While the water valve 10 is closed, the spring 94 (and, if present, water pressure in the pipe 73 (FIG. 2)) urges the piston 92 toward the water cavity 12, and thus urges the piston-sealing ring 96 against the rear end 24 of the water cavity (as shown in FIG. 4), such that the piston-sealing ring forms a watertight seal with the end 24.

To open the water valve 10, one inserts a device, such as a water connector or handle (not shown in FIG. 4), into the receptacle 34 to break the watertight seal, and to allow water to flow (from left to right in FIG. 4) through the water cavity 12 and out of the receptacle. While one inserts the device, the device pushes the member 100, and thus the connecting rod 98, toward the coupler 14. If one inserts the device with sufficient force, the device pushes against the member 100 and rod 98 with a force sufficient to move the piston 92 and piston-sealing ring 96 away from the rear end 24 of the water cavity, and thus with a force sufficient to break the watertight seal. Once the watertight seal is broken, water flows from the water pipe 73 (FIG. 2), through the coupler 14, water cavity 12, and rear end 30 of the plate-assembly 16, out of the receptacle 34, and through the device. The watertight seal remains broken, and, therefore, the water valve 10 remains open, as long as the device remains engaged with the receptacle 34. The insertion of such a device, and the opening of the water valve 10, is further described below in conjunction with FIGS. 5-7.

Figure 5:
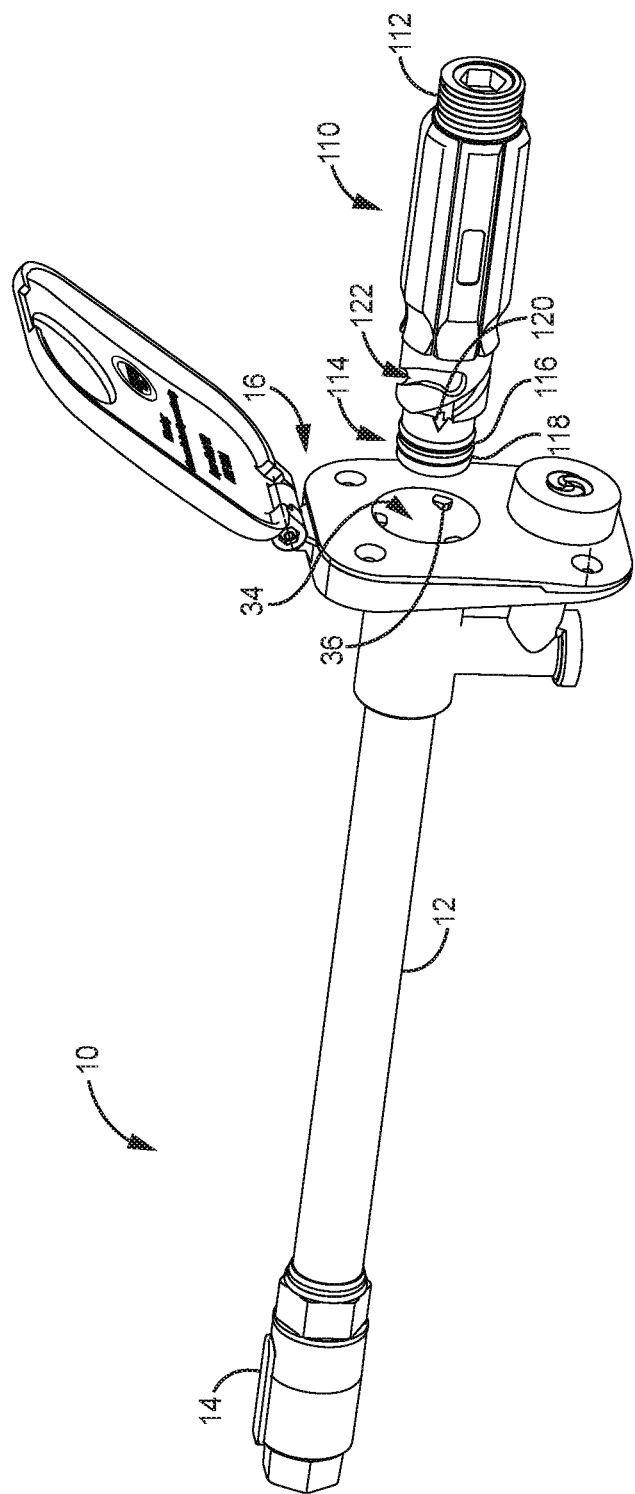
FIG. 5 is an exploded isometric view of the water valve of FIGS. 1-2 and 4, and of a water handle configured for attaching to the water valve, according to an embodiment.

FIG. 5 is an exploded view of the water valve 10 of FIGS. 1-4 and of a water-valve-opening-and-water-dispensing device, here a water handle, 110 configured to open the water valve and to dispense water, according to an embodiment.

The water handle 110 includes a threaded front end 112 and a rear end 114 that includes two sealing rings 116 and 118.

FIGS. 6A-6D are respective exploded views of the water valve 10 and of the water handle 110 before and after the water handle is inserted into the water valve, according to an embodiment.

Figure 7:
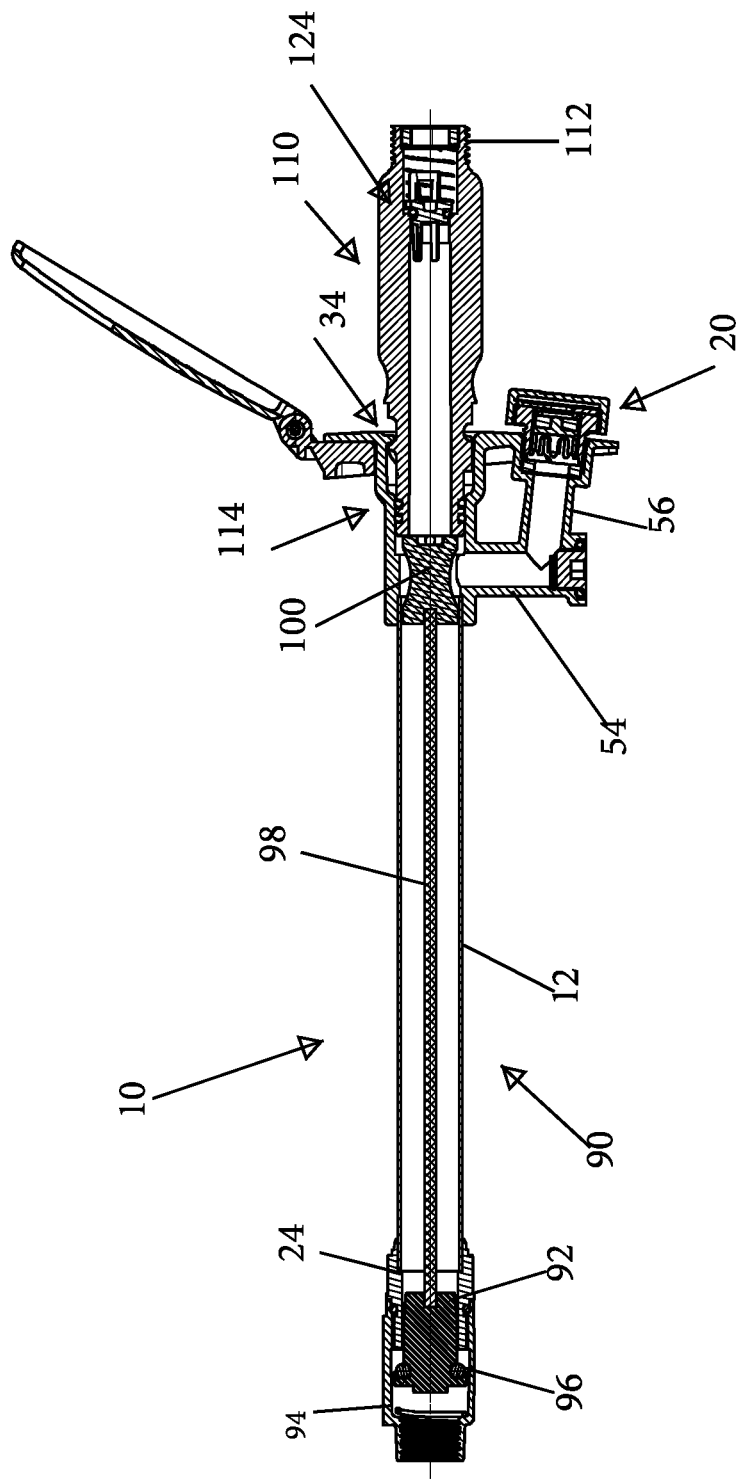
FIG. 7 is a cutaway side view of the water valve of FIGS. 1-2, and 4-6D while the water valve is open, and of the water handle of FIGS. 5-6D while the water handle is attached to the water valve, according to an embodiment.

FIG. 7 is a cutaway side view of the water handle 110 fully inserted in the water valve 10, which is in an open position, according to an embodiment.

Referring to FIGS. 5-7, a procedure for inserting the water handle 110 into the water valve 10, and for thereafter dispensing water via the inserted water handle, is described, according to an embodiment.

First, one grasps the water handle 110, and aligns the arrow 120 with one of the protrusions 36 disposed around an inner wall of the receptacle 34.

Next, he/she inserts the rear end 114 of the water handle 110 into the receptacle 34 and rotates the water handle clockwise. As he/she rotates the water handle 110 clockwise, he/she applies a torque that causes spiral grooves 122 on the outside of the rear end 114 to engage the protrusions 36 of the face-plate assembly 16. The engagement of the protrusions 36 by the spiral grooves 122 converts the torque being applied to the water handle 110 into a linear force that moves the rear end 114 of the water handle further into the receptacle 34. If the linear force is strong enough to overcome the opposing force generated by the combination of the piston-return spring 94 and the water pressure from the water pipe 73 (FIG. 2), then the rear end 114 of the water handle 110, via the member 100 and the connecting rod 98 of the water-valve assembly 90, pushes the piston 92 and the piston-sealing ring 96 away from the rear end 24 of the water cavity 12, and thus breaks the watertight seal between the sealing ring 96 and the rear end 24. Breaking the watertight seal allows water to flow from the pipe 73, through the water cavity 12 and the receptacle 34, into the rear end 114 of the water handle 110, and out from the front end 112 of the water handle. A garden hose, or other water-dispensing tool (not shown in FIGS. 5-7), can be coupled to the front end 112 of the water handle 110 to direct the dispensed water as desired.

The two seal rings 116 and 118 form a watertight seal between the interior wall of the receptacle 34 and the rear end 114 of the water handle 110 such that little or no water leaks from the region between the rear end 114 and the interior wall of the receptacle 34. The dual sealing rings 116 and 118 also prevent one from being "squirted" or splashed as water flows into the water cavity 12 before the rear end 114 of the water handle 110 is fully inserted into, and seated within, the receptacle 34.

The water handle 110 can include a valve assembly 124 configured to prevent water from flowing out from the front end 112 of the water handle unless a device, such as a garden hose, is attached to the front end 112.

Furthermore, the magnitude of torque required to fully insert the rear end 114 of the water handle into the receptacle 34 can depend on the number of protrusions 36 and spiral grooves 122 (the number or protrusions typically equals the number of grooves). Generally, the higher the number of protrusions 36 and grooves 122, the lower the magnitude of torque required. It has been determined that three protrusions 36 and three grooves 122 are sufficient to allow a woman of average strength to install the water handle 110 into the receptacle 34 for a typical expected range of residential water pressure (e.g., 138 kilopascals (kPa)-827 kPa, which is equivalent to 20 pounds per square inch (PSI)-120 PSI).

Moreover, once the rear end 114 of the water handle 110 is fully inserted into the receptacle 34, the protrusions 36 and the spiral grooves 122 are configured to maintain the water handle fully inserted into the receptacle 34 as long as the pressure of the water within the water cavity 12 does not exceed a pressure for which the water valve 10 and water handle are configured.

Still referring to FIGS. 5-7, to remove the water handle 110 and, therefore, to close the water valve 10, one rotates the water handle counterclockwise. The disengagement of the protrusions 36 by the spiral grooves 122 converts the torque being applied to the water handle 110 into a linear force that moves the rear end 114 of the water handle further out from the receptacle 34; the water pressure in the pipe 73 (FIG. 2) and the return spring 94 add to this water-handle-removing linear force. Therefore, the rear end 114 of the water handle 110, via the member 100 and connecting rod 98 of the water-valve assembly 90, releases the piston 92 and the piston-sealing ring 96 such that the water pressure in the pipe 73 and the piston-return spring 94 urge the piston and the piston-sealing ring toward, and urge the piston-sealing ring against, the rear end 24 of the water cavity 12 to re-establish the watertight seal between the piston-sealing ring 96 and the rear end 24 (see FIG. 4). Furthermore, the dual sealing rings 116 and 118 on the outside of the rear end 114 of the water handle 110 prevent one from being "squirted" or splashed with water as one disengages the rear end 114 from the receptacle 34. Without the presence of the two sealing rings 116 and 118, such squirting or splashing could be caused by back water pressure in the garden hose, or other device, attached to the front end 112 of the water handle 110.

After one removes the rear end 114 of the water handle 110 from the receptacle 34, any water remaining in the water cavity 12 drains out via the receptacle due to a gravity-induced flow, which draining prevents standing water from forming and freezing inside of the water cavity. Furthermore, if the anti-siphon assembly 20 is present, water remaining in the tubes 54 and 56 drains out from the valve assembly 58 due to a gravity-induced flow, which draining prevents standing water from forming and freezing inside of the anti-siphon assembly.

Still referring to FIGS. 5-7, alternate embodiments are contemplated for the water valve 10, the water handle 110, the procedure for inserting the water handle 110 into the receptacle 34, and the procedure for removing the water handle from the receptacle. For example, the water valve 10 can include two, or more than three, protrusions 36, and the water handle (or other device) 110 can include two, or more than three, spiral grooves 122. Furthermore, the grooves 122 can be configured so that one turns the water handle 110 in a counterclockwise direction to insert the water handle into the receptacle 34, and in a clockwise direction to remove the water handle from the receptacle. Moreover, the water handle 110 can be formed from any suitable material such as metal (e.g., stainless steel) or a polymer (e.g., PVC), and can be formed from one material (e.g., PVC) even when the protrusions 36 are formed from another material (e.g., stainless steel).

Figure 8:
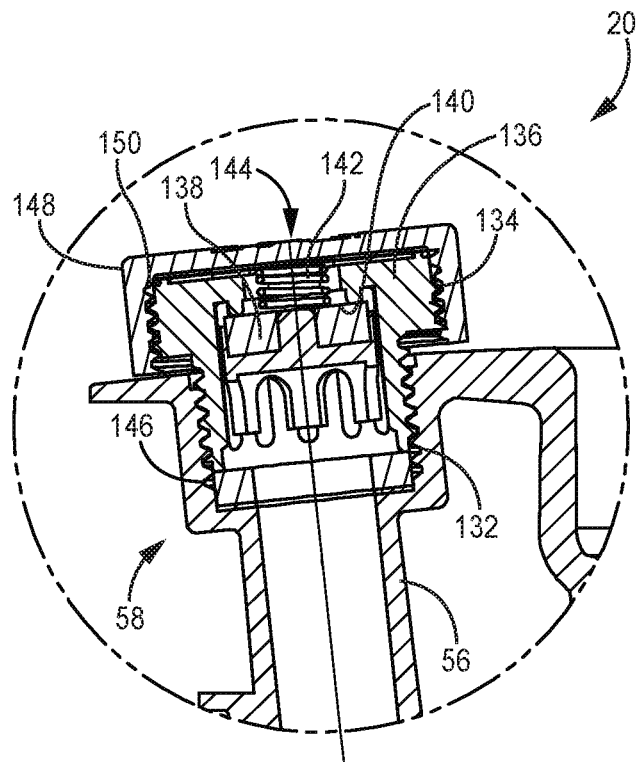
FIG. 8 is a cutaway side view of the anti-siphon assembly of FIGS. 1-2 while the anti-siphon assembly is closed, according to an embodiment.

FIG. 8 is a cutaway side view of the anti-siphon assembly 20 of FIGS. 1 and 2-7 with the valve assembly 58 in closed position, according to an embodiment. The valve assembly 58 includes threads 132 and 134, a valve base 136, a water-stop gasket 138, a sealing surface 140, a return spring 142, and a valve opening 144. The threads 132 engage threads 146 of the anti-siphon tube 56 to secure the valve assembly 58 to the water valve 10 (e.g., FIG. 7). The anti-siphon assembly 20 also includes a cover 148 having threads 150, which engage the threads 134 to secure the cover to the valve assembly 58. The valve assembly 58 and its components can be formed from any suitable materials, such as a metal (e.g., stainless steel), a polymer (e.g., PVC), rubber (e.g., the gasket 138 can be formed from rubber or a rubber-like material), and the like.

Figure 9:
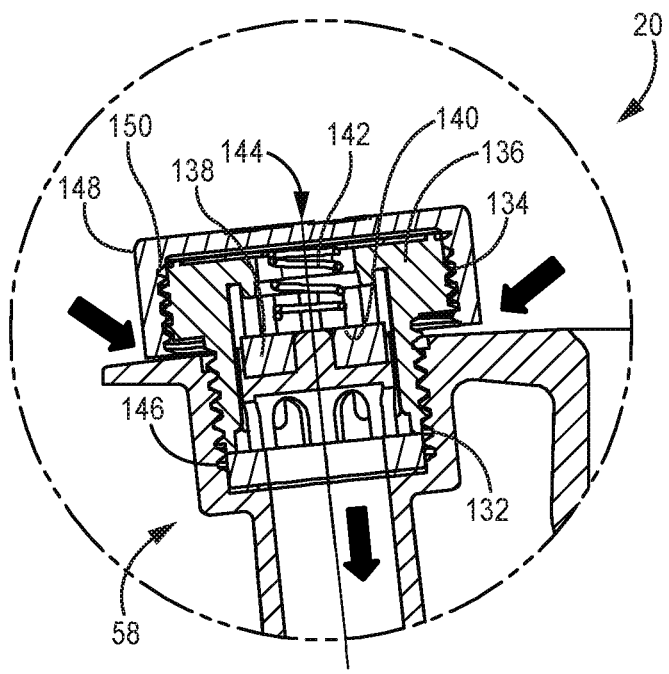
FIG. 9 is a cutaway side view of the anti-siphon assembly of FIGS. 1-2 and 8 while the anti-siphon assembly is open, according to an embodiment.
Figure 12A:
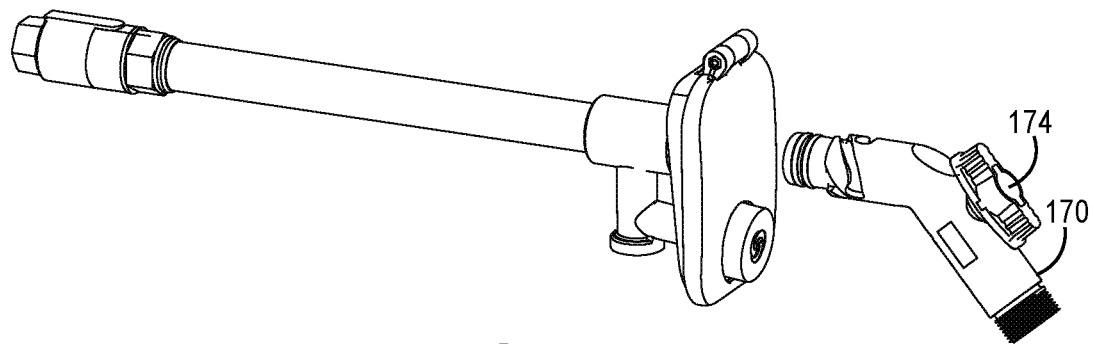
FIGS. 12A-12B are a set of views including an exploded isometric view (FIG. 12A) and an unexploded isometric view (FIG. 12B) of a water spigot before and after attachment to the water valve of FIGS. 1-2, and 4-7, according to an embodiment.
Figure 12B:
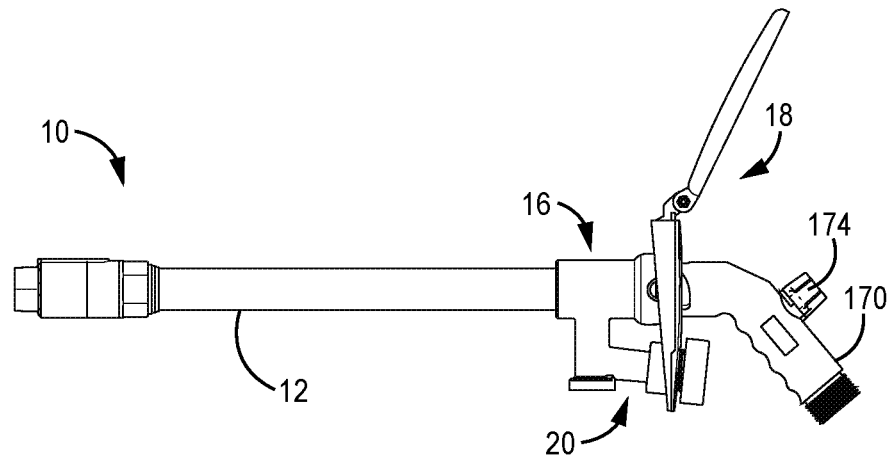
Figure 13A:
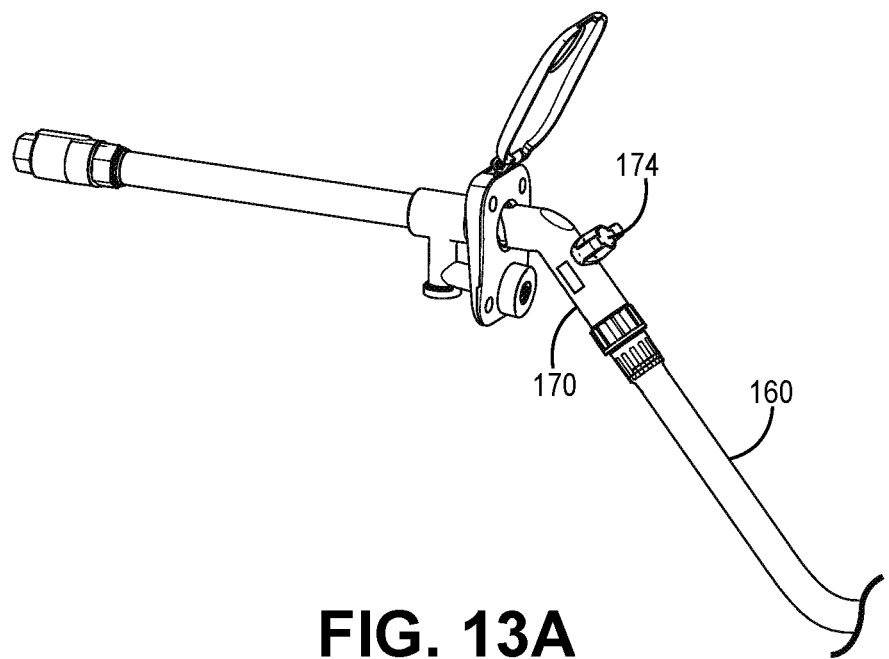
FIGS. 13A-13B are a set of views illustrating uses of the water spigot of FIGS. 12A-12B, according to an embodiment.
Figure 13B:
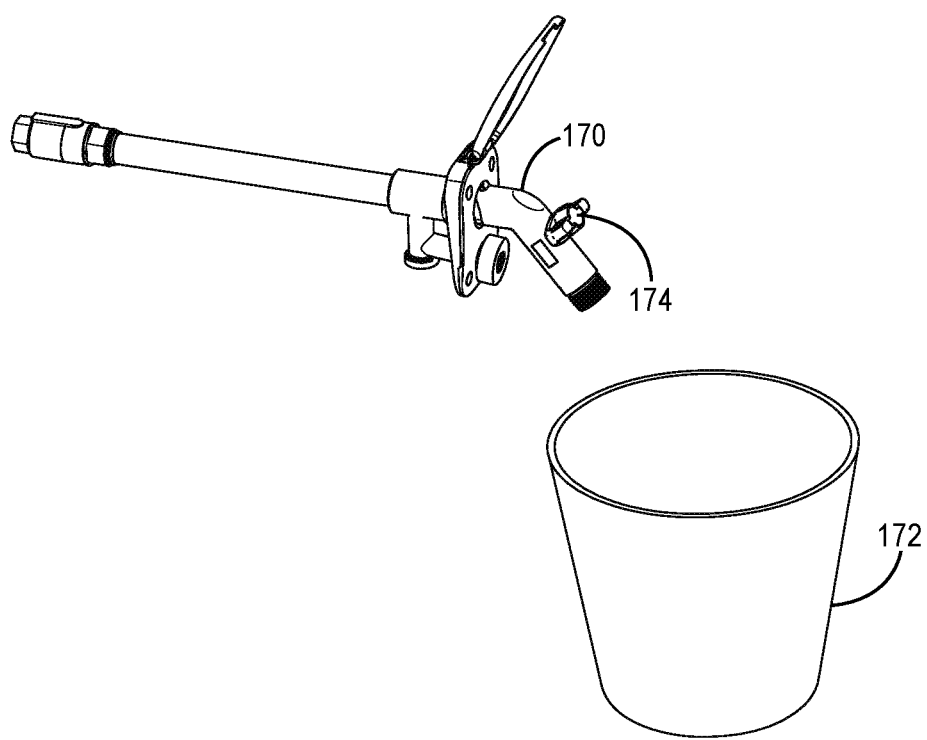
Figure 14B:
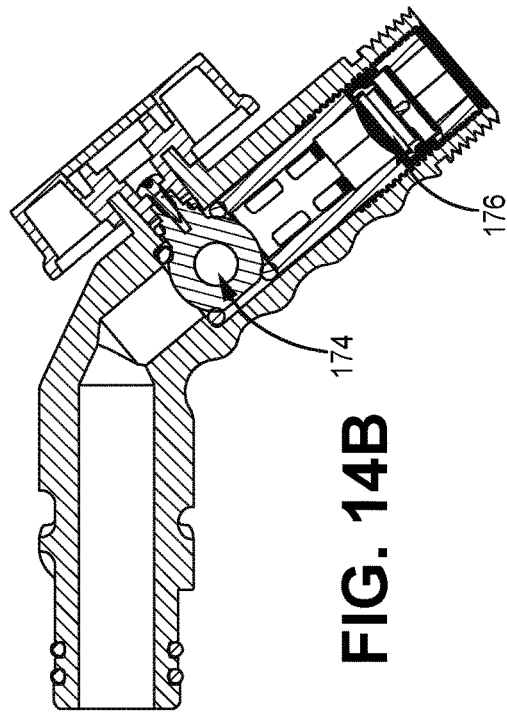
FIGS. 14A-14D are a set of views of the water spigot of FIGS. 12A-13B, according to an embodiment.
Figure 14D:
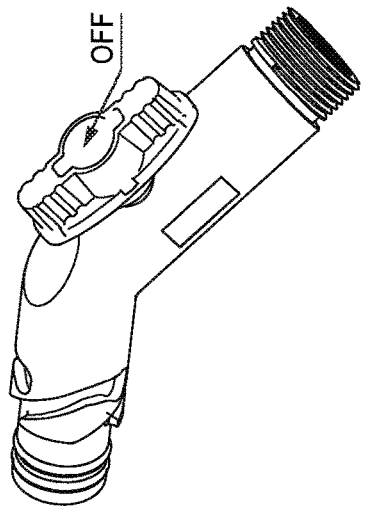
Figure 14A:
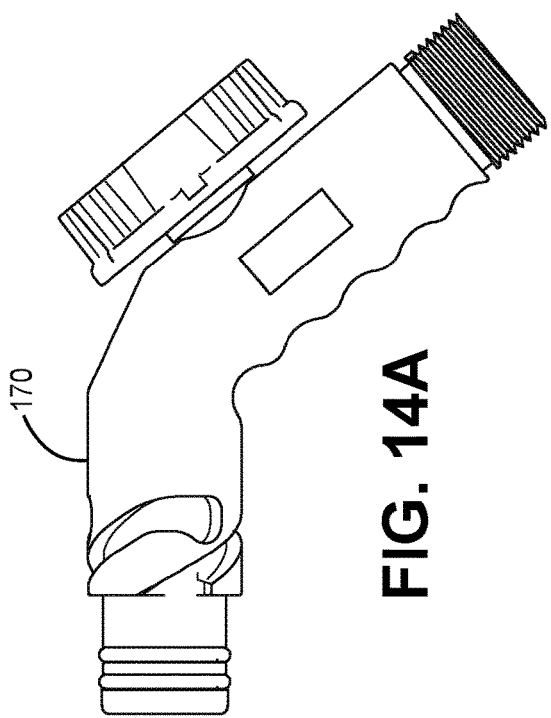
Figure 14C:
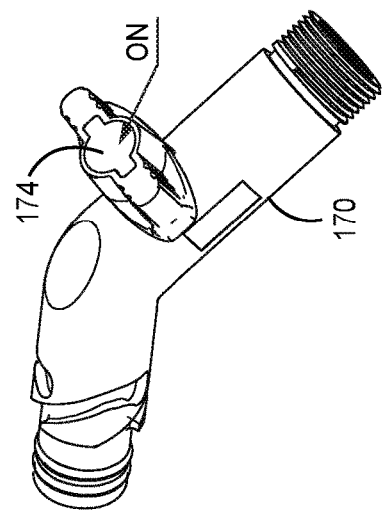
Figure 15D:
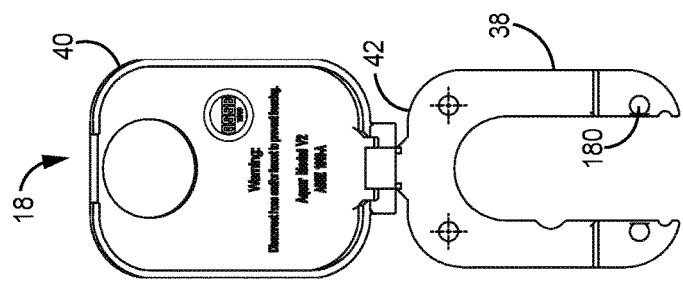
FIGS. 15A-15E are a set of views of the water valve and the cover assembly of FIGS. 1-2, 4-7, and 12A-13B, according to an embodiment.
Figure 15C:
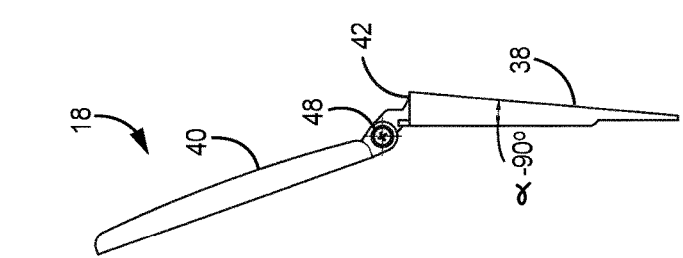
Figure 15E:
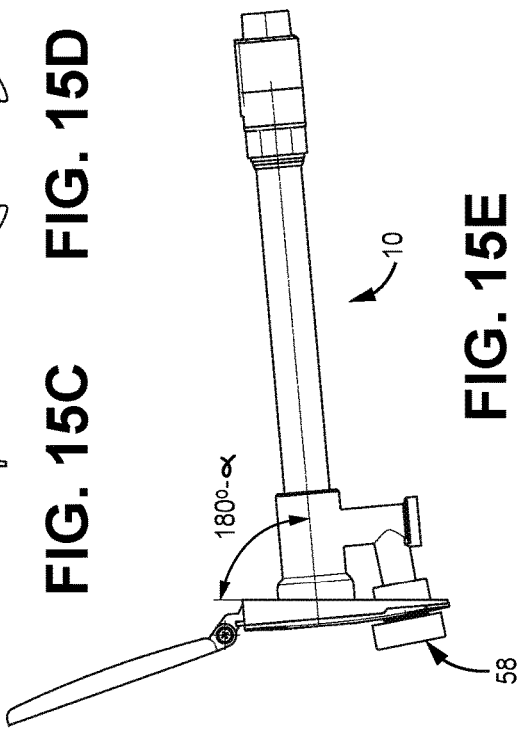
Figure 15B:
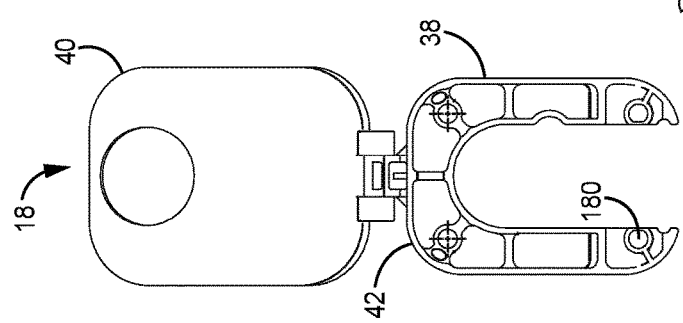
Figure 15A:
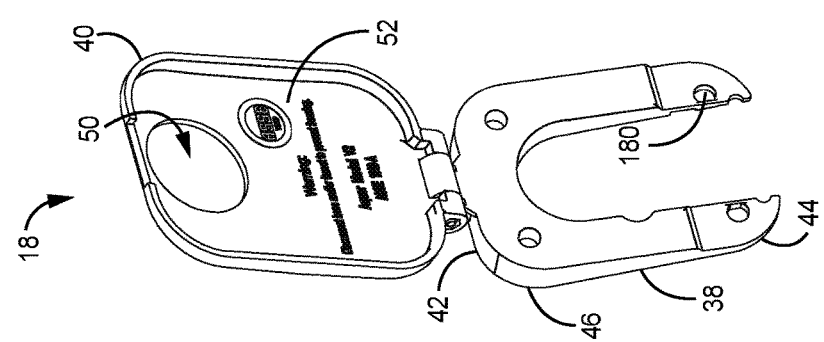

FIG. 9 is a cutaway side view of the anti-siphon assembly 20 of FIGS. 1 and 2-8 with the anti-siphon valve assembly 58 in an open position, according to an embodiment.

Referring to FIGS. 7-9, operation of the anti-siphon assembly 20 is described, according to an embodiment.

When the water valve 10 is opened, water fills the tubes 54 and 56. The pressure of the water generates a force sufficient to overcome the force of the spring 142 such that the water pressure forces the water-stop gasket 138 against the sealing surface 140, and thus causes the gasket and sealing surface to form a watertight seal such that no water flows through the valve opening 144 (see FIG. 8).

Under certain conditions, the water pressure in the water cavity 12 can suddenly and momentarily decrease. Such a decrease can be caused, for example, by the opening of one or more other valves in the water-supply-and-distribution system to which the water valve 10 is connected.

Without the anti-siphon assembly 20, this pressure decrease could allow outside water from a reservoir to which the water valve 10 is connected to enter, via the receptacle 34, the water-supply-and-distribution system. Examples of such a reservoir can include a garden hose having an end coupled to the water valve 10 and filled with water, and a swimming pool, spa, garden, or mud hole in which an opposite end of the garden hose is disposed. The entering of such outside water into the water-supply-and-distribution system is often undesired because such outside water can carry contaminants, such as dirt, bacteria and other infections agents, or chemicals.

To prevent outside water from entering the water valve 10, and, therefore, the water-supply-and-distribution system to which the water valve is connected, in response to such a pressure drop, the valve assembly 58 opens to equalize the pressure within the water cavity 12. During this momentary drop in pressure within the water cavity 12, the pressure of the air outside of the valve opening 144 and the return spring 142 generate a force that is sufficient to overcome the force generated by the dropped water pressure, and, therefore, that is sufficient to open the valve assembly 58 by urging the gasket 138 away from the sealing surface 140 to break the watertight seal. In response to the breaking of the watertight seal, air flows through the valve opening 144 to compensate for the momentary pressure drop inside of the water cavity 12 (i.e., to equalize the pressure inside of the water-supply-and-distribution system with the pressure outside of the water-supply-and-distribution system). This pressure compensation prevents outside water from flowing through the receptacle 34 into the water-supply-and-distribution system. Another way to view the above-described operation is that the momentary drop in water pressure creates a suction that "sucks" in air through the valve assembly 58 instead of "sucking" outside water in through the receptacle 34.

As soon as the water pressure within the water-supply-and-distribution system increases back to normal (i.e., as soon as the pressure difference between the inside water and outside water is equalized), the water pressure in the water cavity 12 and the tubes 54 and 56 increases back to normal.

The increased water pressure generates a force sufficient to overcome the force of the spring 142 and the air outside of the valve opening 144 such that the water pressure forces the water-stop gasket 138 against the sealing surface 140, and thus causes the gasket and sealing surface to re-establish a watertight seal such that no water flows through the valve opening.

The valve assembly 58 is configured to repeat the above operation in response to subsequent drops in water pressure within the water-supply-and-distribution system.

As described above, when the water valve 10 is closed by removal of a device such as the water handle 110, water remaining in the water cavity 12 drains out through the receptacle 34 such that there is no water pressure in the water cavity or in the tubes 54 and 56.

In response to the lack of water pressure, the return spring 142 urges the water-stop gasket 138 away from the sealing surface 140 to break the watertight seal, and thus to open valve assembly 58.

Therefore, any water remaining in the tubes 54 and 56 can drain through the valve opening 144 such that there is little or no standing water in the tubes that could freeze and damage the water valve 10, or that otherwise could reduce the thermal protection that the water valve affords to the water-supply-and-distribution system to which it is connected.

Referring to FIGS. 8-9, alternate embodiments of the anti-siphon system 20 are contemplated. For example, the valve assembly 58 can be secured to the tube 56 by means (e.g., adhesive, welding) other than the threads 132 and 146.

FIGS. 10A and 10B are views (FIG. 10A exploded) of the water handle 110 of FIGS. 5-7, a hose, such as a garden hose, 160, and an optional vacuum breaker 162, according to an embodiment. If the water valve 10 (FIGS. 1-2, 4-7) includes the anti-siphon assembly 20, then the hose 160 can be coupled directly to the water handle 110. If the water valve 10 does not include the anti-siphon assembly 20, then the hose 160 can be coupled to the water handle 110 via the vacuum breaker 162, which, like the anti-siphon assembly, is configured to compensate for a sudden and momentary pressure drop in the water-supply-and-distribution system to which the water valve is connected. The vacuum breaker 162 can have a structure similar to the structure of the anti-siphon assembly 20, and can be configured to operate in a manner similar to the manner in which the anti-siphon assembly operates as described above in conjunction with FIGS. 8-9. For example, the vacuum breaker 162 can include the anti-siphon valve assembly 58 of FIGS. 8-9. Or the vacuum breaker 162 can have a structure different than the structure of the anti-siphon assembly 20, and can be configured to operate in a manner different than the manner in which the anti-siphon assembly operates.

FIGS. 11A-11B are views (FIG. 11A exploded) of the water handle 110 of FIGS. 5-7, the hose 160 of FIGS. 10A-10B, and a valve switch 164, according to an embodiment. The hose 160 is configured to be coupled to the water handle 110 via the valve switch 164, which allows one to turn "on" (valve switch open) and "off" (valve switch closed) the water to the hose without connecting and disconnecting the water handle 110. Optionally, the water handle 110 can incorporate the valve switch 164, or a similar valve.

FIGS. 12A-14D are views of a water spigot 170 configured for insertion into the receptacle 34 of the water valve 10, according to an embodiment.

One inserts the water spigot 170 into the receptacle 34 in a manner similar to the manner in which he/she inserts the water handle 110 into the receptacle as described above in conjunction with FIGS. 5-7.

Unlike the water handle 110, the water spigot 170, once fully inserted into the receptacle 34, can be angled downward, like a conventional water spigot, to facilitate, e.g., filling a bucket 172 without a hose 160, and to increase the comfort level of one who is used to a conventional water spigot.

The water spigot 170 can be made from any suitable material such as a metal (e.g., stainless steel) or a polymer (PVC), and can be made from one material (e.g., PVC) even where the water valve 10 (FIGS. 1-2, and 4-7) is made from another material (e.g., stainless steel).

The water spigot 170 includes a valve switch 174, which is configured to turn "on" and "off" the water flow without inserting the spigot into, and removing the spigot from, the receptacle 34.

The water spigot 170 also includes a bubbler, or aerator, 176, which is configured to aerate water as it exits the spigot.

Still referring to FIGS. 12A-14D, alternate embodiments of the water spigot 170 are contemplated. For example, the valve switch 174, the aerator 176, or both the valve switch and the aerator, can be omitted from the water spigot 170.

FIGS. 15A-15E are a set of views of the water valve 10 and the cover assembly 18 of FIGS. 1-2, 4-7, and 12A-13B, according to an embodiment. The wedge 38 includes mounting holes 180, which are configured to align with the mounting holes 37 of the face-plate assembly 16 (FIG. 1) when the wedge is positioned behind the face plate 32 prior to installation of the water valve 10.

FIGS. 16A-16C are a set of views of the water valve 10 and the cover assembly 18 of FIGS. 1-2, 4-7, 12A-13B, and 15A-15E (FIG. 16A shows the cover assembly exploded from the face-plate assembly 16), and of a portion of the installation 70 of FIG. 2, according to an embodiment.

Figure 17A:
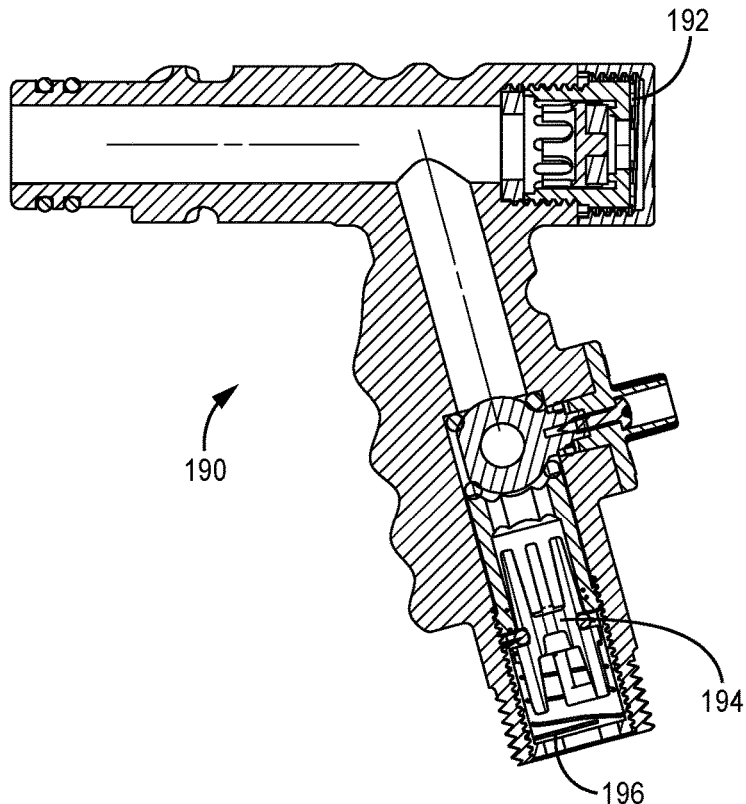
FIGS. 17A-17C are a set of views of a water spigot that includes a check-valve assembly and an anti-siphon assembly, according to an embodiment.
Figure 17B:
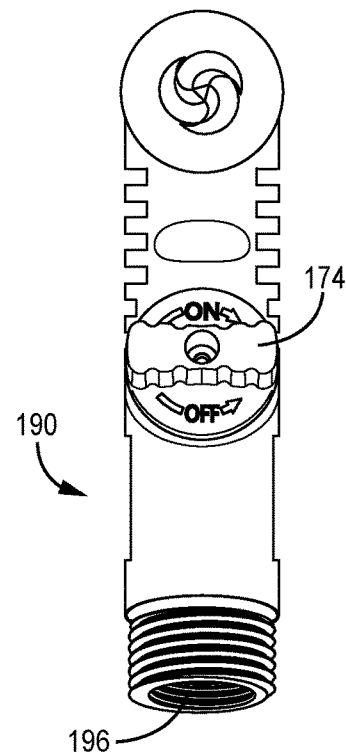
Figure 17C:
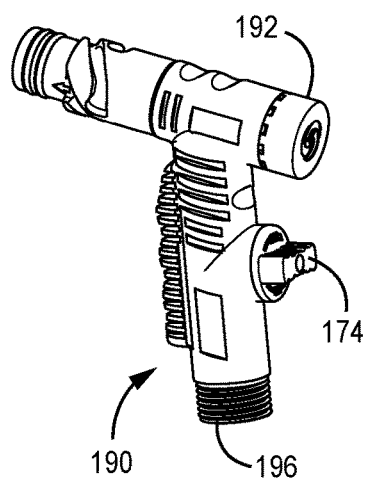

FIGS. 17A-17C are, respectively, a cut-away side view, an end view, and an isometric view of a water spigot 190, according to an embodiment. The water spigot 190 includes an anti-siphon assembly 192 and a check-valve assembly 194, and otherwise can be similar in configuration and operation to the water spigot 170 of FIGS. 5-7. The anti-siphon assembly 192 can be similar in configuration and operation to the anti-siphon assembly 20 of FIGS. 8-9. The check-valve 194 can be any conventional and suitable type of check-valve assembly or check valve, is configured to allow water to flow in only one direction, from the water valve (not shown in FIGS. 17A-17C) out through a dispensing end 196 of the water spigot 190. Therefore, the check-valve assembly 194 is configured to prevent back flow that might otherwise occur in response to a drop in water pressure within the water-supply-and-distribution system to which the water valve is connected. In an alternative embodiment, the water spigot 190 includes one, but not both, of the anti-siphon assembly 192 and check-valve assembly 194. Including one or both of the anti-siphon assembly 192 and the check-valve assembly 194 can render the water spigot 190 suitable for use with a water valve (such as the water valve described below in conjunction with FIGS. 18A-18B) that includes no anti-siphon assembly 20. For example, if the building code of a municipality requires that a structure's water-supply-and-distribution system include anti-siphon functionality, the water spigot 190 can render the water-supply-and-distribution system building-code compliant even if used with a water valve that includes no anti-siphon assembly 20.

Figure 18A:
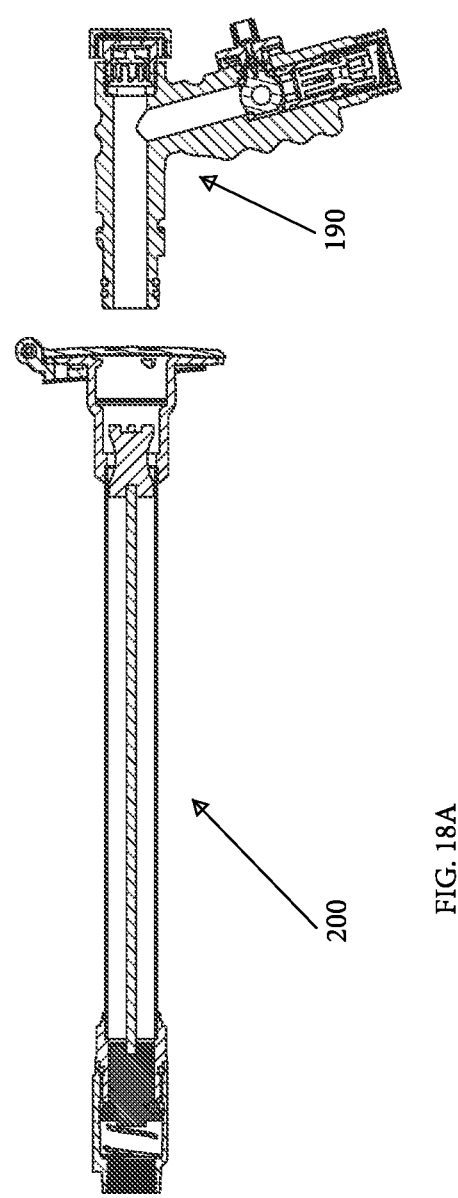
FIGS. 18A-18B are a set of views of the water spigot of FIGS. 17A-17C and a water valve similar to the water valve of FIGS. 1-2 and 4-7 but lacking an anti-siphon assembly, according to an embodiment.
Figure 18B:
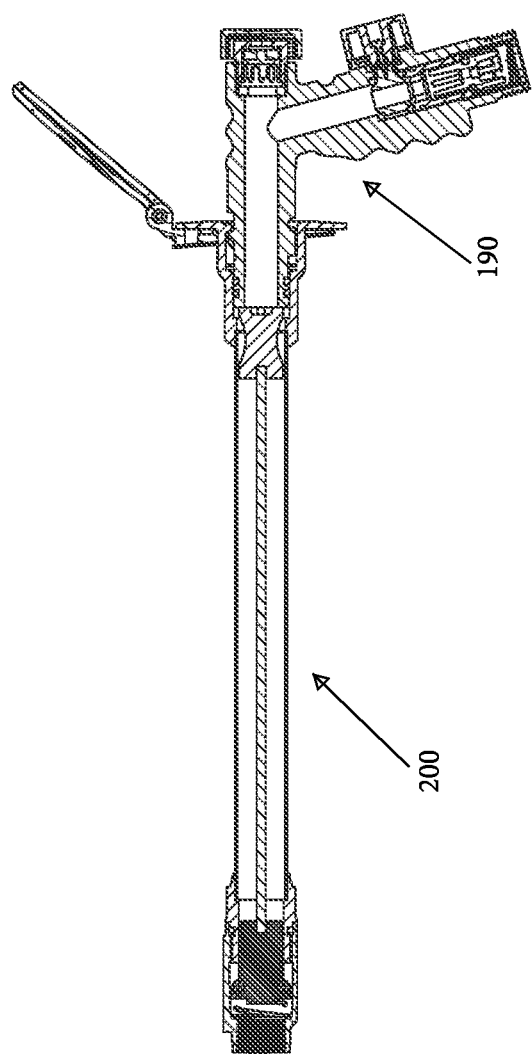

FIGS. 18A-18B are, respectively, an exploded cut-away side view of the water spigot 190 of FIGS. 17A-17C and a closed water valve 200, and a cut-away side view of the water spigot connected to an open water valve 200, according to an embodiment. Other than lacking an anti-siphon assembly 20, the water valve 200 can be similar in configuration and operation to the water valve 10 of FIGS. 1 and 4-7. Because the water valve 200 lacks an anti-siphon assembly, it may be less expensive to manufacture than the water valve 10, and also can be installed through a smaller hole in the sidewall of a structure (as compared to the size of the hole needed to install the water valve 10). And, as described above in conjunction with FIGS. 17A-17C, using the water spigot 190 with the water valve 200 can render the combination of the water spigot and the water valve building-code compliant even though the water valve lacks an anti-siphon assembly.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, one or more components of a described apparatus or system may have been omitted from the description for clarity or another reason. In addition, one or more components of a described apparatus or system that have been included in the description may be omitted from the apparatus or system.

Example Embodiments

Example 1 includes a fluid valve, comprising: a substantially flat face plate; a receptacle disposed in the face plate and having at least one protrusion each configured to engage a respective at least one groove of a valve-opening-and-fluid-dispensing device; a cavity having a front end in fluid communication with the receptacle, and having a rear end; and a valve assembly disposed in the cavity, including a first sealing ring, configured to form a seal by urging the sealing ring against the rear end of the cavity in response to the valve-opening-and-fluid-dispensing device being absent from the receptacle, and configured to allow fluid to flow into the rear end of the cavity in response to the valve-opening-and-fluid-dispensing device being disposed in the receptacle.

Example 2 includes the fluid valve of Example 1 wherein the receptacle has three protrusions that are substantially evenly spaced around the receptacle.

Example 3 includes the fluid valve of Example 1 wherein the valve assembly further includes: a piston around which the first sealing ring is disposed; a piston-return spring configured to urge the sealing ring against the rear end of the cavity; a connecting rod having a first end coupled to the piston and having a second end; and a member coupled to the second end of the connecting rod and configured to urge, via the connecting rod and the piston, the sealing ring away from the rear end of the cavity in response to the valve-opening-and-fluid-dispensing device being disposed in the receptacle.

Example 4 includes the fluid valve of any of Examples 1-3 wherein the cavity has a length and is configured to provide a level of thermal isolation between the receptacle and the rear end of the cavity, the level of thermal isolation being related to the length.

Example 5 includes the fluid valve of any of Examples 1-4, further comprising a wedge disposable behind the face plate and configured to angle the cavity such that fluid in the cavity drains, due to gravity, toward the receptacle in response to the valve-opening-and-fluid-dispensing device being absent from the receptacle.

Example 6 includes the fluid valve of any of Examples 1-5, further comprising: a threaded coupler rotatably coupleable to the rear end of the cavity; and a second sealing ring configurable to form a seal between an outer side of the rear end of the cavity and an overlapping inner side of the threaded coupler over a range of rotation of the cavity relative to the threaded coupler of at least approximately 360°.

Example 7 includes the fluid valve of any of Examples 1-6, further comprising an anti-siphon assembly that is positionable beneath the receptacle and that is configured to allow fluid in the cavity to drain, due to gravity, out of the anti-siphon assembly in response to the valve-opening-and-fluid-dispensing device being absent from the receptacle.

Example 8 includes the fluid valve of any of Examples 1-7, further comprising an anti-siphon assembly that includes: an anti-siphon opening disposed in the face plate; at least one anti-siphon tube disposed between the anti-siphon opening and the cavity; an anti-siphon valve assembly disposed in the opening, configured to close in response to a pressure inside of the at least one tube being greater than a pressure outside of the at least one tube, and configured to open in response to a pressure inside of the at least one tube being less than a pressure outside of the at least one tube.

Example 9 includes the fluid valve of any of Examples 1-8, further comprising an anti-siphon assembly that includes: an anti-siphon opening disposed in the face plate; at least one anti-siphon tube disposed between the anti-siphon opening and the cavity; an anti-siphon valve assembly disposed in the opening, having an inner end facing the tube, and having an outer end facing away from the tube, the anti-siphon valve assembly configured to close in response to a pressure at the inner end being greater than a pressure at the outer end, and configured to open in response to a pressure at the inner end being less than a pressure at the outer end.

Example 10 includes a structure, comprising: a water-distribution system; and a water valve coupled to the water-distribution system and including a substantially flat face plate, a receptacle disposed in the face plate and having at least one protrusion each configured to engage a respective at least one groove of a valve-opening-and-fluid-dispensing device, a cavity having a front end in fluid communication with the receptacle, and having a rear end coupled to, and in fluid communication with, the water-distribution system, and a valve assembly disposed in the cavity, including a first sealing ring, configured to form a seal by urging the sealing ring against the rear end of the cavity in response to the valve-opening-and-fluid-dispensing device being absent from the receptacle, and configured to allow fluid to flow from the water-distribution system into the cavity in response to the valve-opening-and-fluid-dispensing device being disposed in the receptacle.

Example 11 includes the structure of Example 10, further comprising: a surface having a hole; and wherein the water valve includes a face-plate assembly having the face plate and having a rear end in fluid communication with, and disposed between, the receptacle and the cavity, the face plate being mounted to the surface and the rear end of the face-plate assembly at least partially disposed within the hole.

Example 12 includes the structure of Example 11 wherein the surface includes a wall.

Example 13 includes a method, comprising engaging each of at least one spiral groove of a valve-opening-and-fluid-dispensing device with a respective protrusion disposed inside of a receptacle of a fluid valve; rotating the valve-opening-and-fluid-dispensing device in a direction that causes the device to move into the receptacle; in response to the valve-opening-and-fluid-dispensing device moving into the receptacle, breaking a fluid-tight seal between the fluid valve and a fluid-distribution system by urging, with a connecting rod, a sealing ring away from a rear end of a cavity of the fluid valve.

Example 14 includes the method of Example 13 wherein during the rotating the at least one spiral groove and the at least one respective protrusion convert a torque in the direction of rotation into a force directed into the receptacle.

Example 15 includes a method, comprising rotating a valve-opening-and-fluid-dispensing device in a direction that causes the device to move out from a receptacle of a fluid valve, the device having at least one spiral groove each engaged with a respective protrusion of the receptacle; and in response to the valve-opening-and-fluid-dispensing device moving out from the receptacle, forming a fluid-tight seal between the fluid valve and a fluid-distribution system by reducing a first force with which the device, via a connecting rod, opposes a second force that urges a sealing ring toward a rear end of a cavity of the fluid valve.

Example 16 includes the method of Example 15 wherein during the rotating the at least one spiral groove and the at least one respective protrusion convert a torque in the direction of rotation into a force directed out from the receptacle.

Example 17 includes a method, comprising: rotating a threaded end of a fluid valve relative to a threaded first end of a coupler to orient the fluid valve relative to a structure to which the fluid valve is to be secured, a second end of the coupler being connected to a fluid-distribution system, a sealing ring forming a fluid-tight seal between overlapping sides of the threaded end of the fluid valve and the threaded first end of the coupler; and securing the fluid valve to the structure.

Example 18 includes the method of Example 17, further comprising: connecting the second end of the coupler to a flexible conduit of the fluid-distribution system before rotating the threaded end of the fluid valve relative to the threaded first end of the coupler, the flexible conduit protruding through a hole in the structure; and moving the flexible conduit, the coupler, and the threaded end of the fluid valve through the hole into the structure before securing the fluid valve to the structure.

Example 19 includes the method of Example 18, further comprising moving the flexible conduit through the hole to outside of the structure before connecting the second end of the coupler to the flexible conduit.

Example 20 includes a valve-opening-and-fluid-dispensing device, comprising: at least one spiral groove each configured to engage a respective protrusion of a water-valve receptacle; a fluid conduit; and a valve assembly configured to prevent fluid back flow through the fluid conduit.

Example 21 includes the valve-opening-and-fluid-dispensing device of Example 20 wherein the valve assembly includes a check-valve assembly.

Example 22 includes the valve-opening-and-fluid-dispensing device of Example 20 wherein the valve assembly includes an anti-siphon valve assembly.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A water valve, comprising:
    a face plate;
    a receptacle disposed in the face plate and having at least one protrusion each configured to engage a respective at least one groove of a valve-opening-and-water-dispensing device;
    a cavity having a front end in water communication with the receptacle, and having a rear end;
    a valve assembly disposed in the cavity and including a first sealing ring configured to form a watertight seal by urging the first sealing ring against the rear end of the cavity in response to the valve-opening-and-water-dispensing device being absent from the receptacle, the valve assembly configured to allow water to flow into the rear end of the cavity in response to the valve-opening-and-water-dispensing device being disposed in the receptacle;
    an anti-siphon opening disposed in the face plate; and
    an anti-siphon assembly having a tube that couples the anti-siphon opening to the cavity and having a single anti-siphon valve assembly that is at least partially disposed in the anti-siphon opening, configured to allow water in the cavity to drain, due to gravity, out of the anti-siphon assembly via the tube in response to the valve-opening-and-water-dispensing device being absent from the receptacle, and configured to stop water in the cavity from draining out of the anti-siphon assembly in response to the valve-opening-and-water-dispensing device being disposed in the receptacle.

2. The water valve of claim 1 wherein the receptacle has three protrusions that are substantially evenly spaced around the receptacle.

3. The water valve of claim 1 wherein the valve assembly further includes:
    a piston around which the first sealing ring is disposed;
    a piston-return spring configured to urge the first sealing ring against the rear end of the cavity;
    a connecting rod having a first end coupled to the piston and having a second end; and
    a member coupled to the second end of the connecting rod and configured to urge, via the connecting rod and the piston, the first sealing ring away from the rear end of the cavity in response to the valve-opening-and-water-dispensing device being disposed in the receptacle.

4. The water valve of claim 1 wherein the cavity has a length and is configured to provide a non-zero level of thermal isolation between the receptacle and the rear end of the cavity, the non-zero level of thermal isolation being related to the length.

5. The water valve of claim 1, further comprising a wedge disposable behind the face plate and configured to angle the cavity such that water in the cavity drains, due to gravity, toward the receptacle in response to the valve-opening-and-water-dispensing device being absent from the receptacle.

6. The water valve of claim 1, further comprising:
a threaded coupler rotatably coupleable to the rear end of the cavity; and
a second sealing ring configurable to form a seal between an outer side of the rear end of the cavity and an overlapping inner side of the threaded coupler over a range of rotation of the cavity relative to the threaded coupler of at least approximately 360°.

7. A water valve, comprising:
a face plate;
a receptacle disposed in the face plate and having at least one protrusion each configured to engage a respective at least one groove of a valve-opening-and-water-dispensing device;
a cavity having a front end in water communication with the receptacle, and having a rear end;
a valve assembly disposed in the cavity and including a first sealing ring configured to form a watertight seal by urging the first sealing ring against the rear end of the cavity in response to the valve-opening-and-water-dispensing device being absent from the receptacle, the valve assembly configured to allow water to flow into the rear end of the cavity in response to the valve-opening-and-water-dispensing device being disposed in the receptacle; and
an anti-siphon assembly including
an anti-siphon opening disposed in the face plate,
at least one anti-siphon tube disposed between the anti-siphon opening and the cavity, and
a single anti-siphon valve assembly disposed in the opening, positionable beneath the receptacle, configured to allow water in the cavity to drain, due to gravity, out of the anti-siphon assembly in response to the valve-opening-and-water-dispensing device being absent from the receptacle, configured to close in response to a pressure inside of the at least one tube being greater than a pressure outside of the at least one tube, and configured to open in response to a pressure inside of the at least one tube being less than a pressure outside of the at least one tube.

8. A water valve, comprising:
a face plate;
a receptacle disposed in the face plate and having at least one protrusion each configured to engage a respective at least one groove of a valve-opening-and-water-dispensing device;
a cavity having a front end in water communication with the receptacle, and having a rear end;
a valve assembly disposed in the cavity and including a first sealing ring configured to form a watertight seal by urging the first sealing ring against the rear end of the cavity in response to the valve-opening-and-water-dispensing device being absent from the receptacle, the valve assembly configured to allow water to flow into the rear end of the cavity in response to the valve-opening-and-water-dispensing device being disposed in the receptacle; and
an anti-siphon assembly including
an anti-siphon opening disposed in the face plate,
at least one anti-siphon tube disposed between the anti-siphon opening and the cavity, and
a single anti-siphon valve assembly disposed in the opening, positionable beneath the receptacle, configured to allow water in the cavity to drain, due to gravity, out of the anti-siphon assembly in response to the valve-opening-and-water-dispensing device being absent from the receptacle, having an inner end facing the tube, having an outer end facing away from the tube, configured to close in response to a pressure at the inner end being greater than a pressure at the outer end, and configured to open in response to a pressure at the inner end being less than a pressure at the outer end.

9. A structure, comprising:
a water-distribution system; and
a water valve coupled to the water-distribution system and including
a face plate,
a receptacle disposed in the face plate and having at least one protrusion each configured to engage a respective at least one groove of a valve-opening-and-water-dispensing device,
a cavity having a front end in fluid communication with the receptacle, and having a rear end coupled to, and in fluid communication with, the water-distribution system,
a valve assembly disposed in the cavity and including a sealing ring configured to form a watertight seal with the rear end of the cavity in response to the valve-opening-and-water-dispensing device being absent from the receptacle, the valve assembly configured to allow water to flow from the water-distribution system into the cavity in response to the valve-opening-and-water-dispensing device being disposed in the receptacle,
an anti-siphon opening disposed in the face plate beneath the receptacle, and
an anti-siphon assembly having at least one tube in fluid communication with the cavity and the anti-siphon opening and having one and only one anti-siphon valve assembly that is disposed, at least partially, in the anti-siphon opening and that is configured to allow water in the cavity to drain, due to gravity, out of the anti-siphon assembly via the at least one tube in response to the valve-opening-and-water-dispensing device being absent from the receptacle.

10. The structure of claim 9, further comprising:
a surface having a hole; and
wherein the water valve includes a face-plate assembly having the face plate and having a rear end in fluid communication with, and disposed between, the receptacle and the cavity, the face plate being mounted to the surface and the rear end of the face-plate assembly at least partially disposed within the hole.

11. The structure of claim 10 wherein the surface includes a wall.

12. A water valve, comprising:
a face plate having a receptacle with at least one protrusion each configured to engage a respective at least one groove of a valve-opening-and-water-dispensing device;
a cavity having a front end in liquid communication with the receptacle, and having a rear end;
a valve assembly disposed in the cavity, including a sealing ring, and configured
to form a watertight seal by urging the sealing ring against the rear end of the cavity in response to the valve-opening-and-water-dispensing device being absent from the receptacle, and
to allow water to flow into the rear end of the cavity in response to the valve-opening-and-water-dispensing device being disposed in the receptacle; and an anti-siphon assembly including
  an anti-siphon opening in the face plate,
  a tube connecting the cavity to the anti-siphon opening, and
  a single anti-siphon valve assembly that is disposed, at least partially, in the anti-siphon opening.

* * * * *